United States Patent [19]
Nakamura et al.

[11] Patent Number: 5,841,362
[45] Date of Patent: Nov. 24, 1998

[54] OPTIONAL APPARATUS CONNECTABLE TO OTHER APPARATUS

[75] Inventors: Akihiro Nakamura, Kawasaki; Junichi Kimizuka, Yokohama; Hiroshi Hashimoto, Tokyo; Soya Endo, Tokyo; Hitoshi Machino, Tokyo, all of Japan

[73] Assignee: Canon Kabushiki Kaisha, Tokyo, Japan

[21] Appl. No.: 597,275

[22] Filed: Feb. 6, 1996

[30] Foreign Application Priority Data

Feb. 10, 1995 [JP] Japan .................................... 7-046459
Feb. 10, 1995 [JP] Japan .................................... 7-046460
Feb. 10, 1995 [JP] Japan .................................... 7-046461

[51] Int. Cl.$^6$ .................................................. G03G 21/00
[52] U.S. Cl. ............................. 340/825.03; 340/825.06; 340/826; 382/312; 382/317; 382/318; 382/100; 382/101; 355/97; 399/149
[58] Field of Search ........................... 340/825.03, 826, 340/825.06; 382/312, 317, 318, 100, 101; 355/97; 399/149, 267

[56] References Cited

U.S. PATENT DOCUMENTS

| | | | |
|---|---|---|---|
| 4,496,238 | 1/1985 | Tsukada et al. ................... | 355/14 D |
| 4,579,446 | 4/1986 | Fujino et al. ...................... | 355/24 |
| 4,676,499 | 6/1987 | Kimizuka et al. .................. | 271/270 |
| 4,750,731 | 6/1988 | Dei et al. ........................... | 271/287 |
| 4,763,889 | 8/1988 | Dei et al. ........................... | 271/9 |
| 4,853,740 | 8/1989 | Ushio et al. ....................... | 355/319 |
| 4,927,131 | 5/1990 | Hashimoto et al. ................ | 271/215 |
| 5,091,754 | 2/1992 | Abe et al. .......................... | 355/317 |
| 5,100,123 | 3/1992 | Kagiura et al. .................... | 271/164 |
| 5,124,809 | 6/1992 | Koishikawa ....................... | 358/400 |
| 5,132,736 | 7/1992 | Muramatsu et al. ............... | 355/271 |
| 5,154,411 | 10/1992 | Saito et al. ......................... | 271/289 |
| 5,196,885 | 3/1993 | Takeuchi et al. ................... | 355/219 |
| 5,359,400 | 10/1994 | Itoh et al. ........................... | 355/285 |
| 5,379,101 | 1/1995 | Takahashi et al. ................. | 355/309 |
| 5,420,396 | 5/1995 | Itoh rt al. ........................... | 219/497 |
| 5,450,170 | 9/1995 | Kimizuka et al. .................. | 355/218 |
| 5,455,659 | 10/1995 | Ishizu et al. ....................... | 355/209 |
| 5,512,993 | 4/1996 | Endo et al. ......................... | 355/285 |

FOREIGN PATENT DOCUMENTS

| | | |
|---|---|---|
| 4100629 | 8/1992 | Denmark . |
| 2617354 | 12/1988 | France . |
| 2653996 | 6/1978 | Germany . |
| 2067056 | 7/1981 | United Kingdom . |

*Primary Examiner*—Michael Horabik
*Assistant Examiner*—Youel Beaulieu
*Attorney, Agent, or Firm*—Fitzpatrick, Cella, Harper & Scinto

[57] ABSTRACT

An optional apparatus which can be connected to a printer or other optional apparatus includes a communication section for communicating with other apparatus and a control section which executes a command in response to the command received via the communication section; wherein the communication section has a first communication path for receiving a data string from an apparatus on the upstream side in communication and for transmitting the received data string to an apparatus on the downstream side of the communication and a second communication path for receiving a data string received from the apparatus on the downstream side of communication and for transmitting the received data string to the apparatus on the upstream side of the communication; and the control section executes a command in the command string received via the first communication path or the second communication path and loads the data indicating the execution result of the command in the command string.

17 Claims, 20 Drawing Sheets

OPTIONAL APPARATUS CONNECTABLE TO OTHER APPARATUS

BACKGROUND OF THE INVENTION

1. Field of the Invention

The present invention relates to an optional apparatus which can be connected to other apparatus.

2. Related Background Art

Hitherto, when connecting an optional unit, such as a paper supplying unit or a paper ejecting unit, to a printer, the main body of an image generating apparatus (hereinafter referred to simply as "main body") and the optional unit are connected in a serial communication mode. The combination of the optional unit and the main body was fixed; therefore, only one-to-one communication, i.e. the communication between the main body and the optional unit, is considered. In other words, when up to N pieces of optional units were connected to the main body, N communication ports (I/O) were necessary. Further, it was impossible to connect optional units of more than N, leading to limited expandability.

In addition, according to the configuration stated above, the positions of the communication ports of the respective options are limited, making it impossible to change the positional relationship between the main body and the respective options.

SUMMARY OF THE INVENTION

Accordingly, it is an object of the present invention to provide an optional apparatus which has resolved the shortcomings stated above.

Another object of the present invention is to provide an optional apparatus which permits a desired combination of a plurality of optional apparatuses.

A further object of the present invention is to provide an optional apparatus which permits high expandability.

Yet another object of the present invention is to provide an optional apparatus which enables a communication channel to be formed between itself and another apparatus by connecting them in a column.

A still further object of the present invention is to provide an optional apparatus which enables a communication channel to be formed between itself and other apparatuses simply by placing other apparatuses on and/or beneath the optional apparatus.

Other objects and advantages of the present invention will be made apparent from the following detailed description taken in connection with the accompanying drawings.

DESCRIPTION OF THE PREFERRED EMBODIMENTS

The preferred embodiments of the present invention will now be described with reference to the accompanying drawings.

(First Embodiment)

Figure 2:
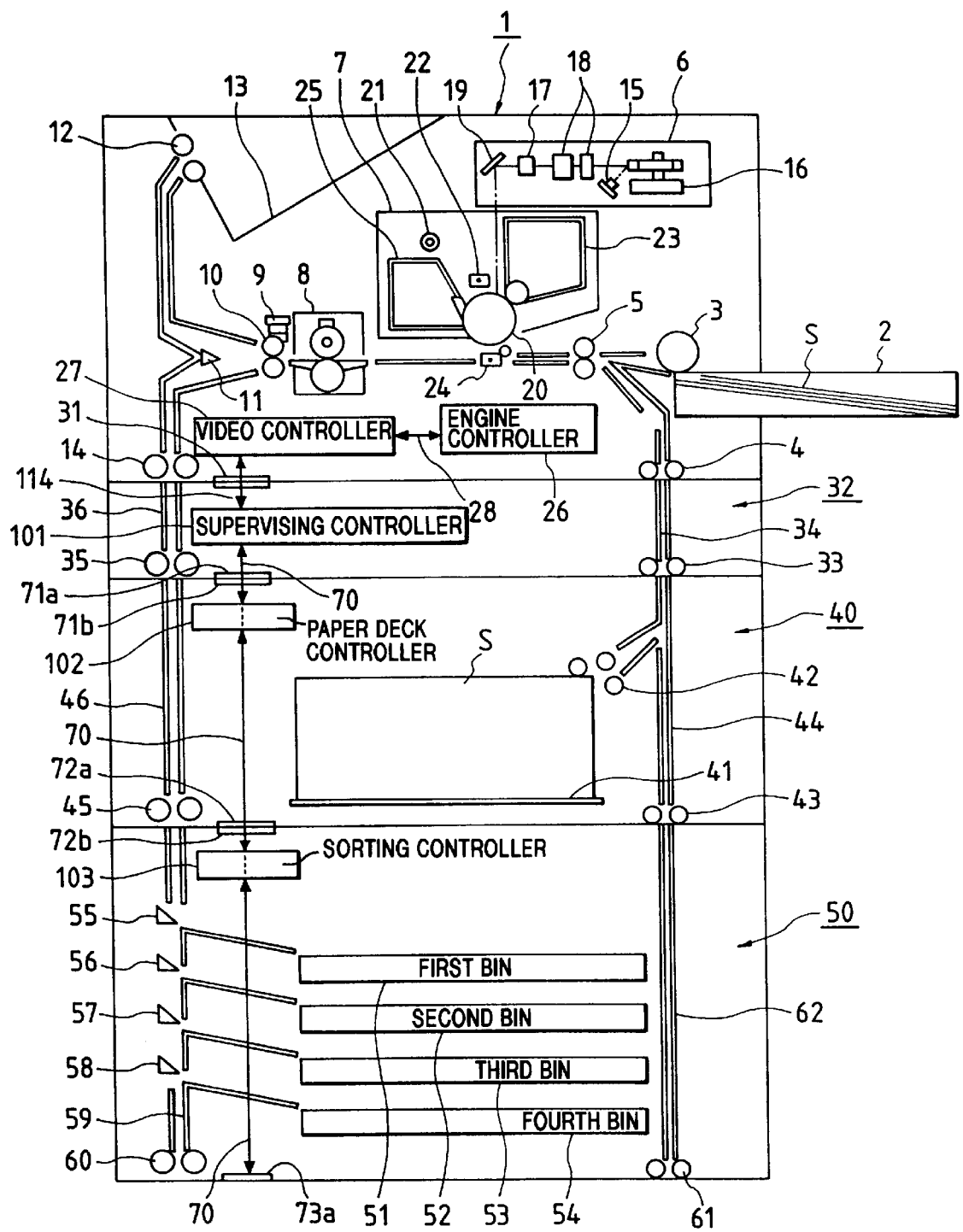
FIG. 2 is a diagram showing the entire configuration of an image recording apparatus which has embodied the present invention.

FIG. 2 shows the entire image generating apparatus to which the serial communication apparatus in accordance with the present invention has been applied; it illustrates a laser beam printer to which an optional unit has been connected. The following description is given to an example wherein two optional units are connected; however, more optional units may be connected. The structure and operation of the image generating apparatus will now be described.

Reference numeral 1 denotes the main body of a laser beam printer (hereinafter referred to simply as "main body"). Recording paper S contained in a cassette 2 is supplied into the main body 1 by a paper feeding roller 3. An optional paper feeding roller 4 supplies the recording paper S fed from a paper feeding optional unit, which will be discussed in detail later, into the main body 1. Provided on the downstream side from the paper feeding roller 3 and the optional paper feeding roller 4 is a pair of registration rollers 5 for synchronously carrying the recording paper S. Provided on the downstream side from the pair of registration rollers 5 is an image recording unit 7 which produces a toner image on the recording paper S by the laser beams emitted from a laser scanner 6.

On the downstream side from the image recording unit 7, a fixer 8 for thermally fixing the toner image produced on the recording paper S is provided. Other sections provided on the downstream side from the fixer 8 include a paper ejection sensor 9 for detecting the paper being ejected at a paper ejector, a carrying roller 10 for carrying the recording paper S, and a flapper 11 for switching the carrying direction of the recording paper S on which the recording has been completed. The recording paper S, which is flapped by the flapper 11, passes through a pair of paper ejecting roller 12 before it is either loaded on a loading tray 13 or sent to a pair of optional ejecting rollers 14 so that it may be carried to a paper ejecting option.

The laser scanner 6 is constituted primarily by: a laser unit 15 emitting a laser beam which has been modulated according to an image signal (image signal VDO) received from a video controller 27, which will be discussed later; a polygon motor 16 which scans the laser beams from the laser unit 15 onto a photosensitive drum 20; a beam detector 17 for detecting the position of a laser beam in scanning direction; a group of image forming lenses 18; and an aliasing mirror 19. The image recording unit 7 is comprised primarily of a photosensitive drum 20, a pre-exposure lamp 21, a primary charging device 22, a developing device 23, a transfer discharging device 24, and a cleaner 25.

Reference numeral 26 denotes an engine controller which controls the electrophotographic process implemented by the laser scanner 6, the image recording unit 7, and a fixer 8, and which also controls the transfer of the recording paper in the main body 1. The video controller 27 is connected to an external apparatus such as a personal computer (not shown) through a general-purpose interface, e.g. Centronics or RS232C interface; it evolves the image information received via the general-purpose interface into bit data and sends the bit data as signal VDO to the engine controller 26. A video interface 28 enables the communication between the video controller 27 and the engine controller 26.

Various optional units which are detachably connected to the main body 1 will now be described. An option supervising unit 32 is equipped with a supervising controller 101 which supervises and controls the various optional units, the supervising controller 101 being connected to the video controller 27 via a supervising interface 114 which is connected by a connector 31. The option supervising unit 32 is also equipped with a pair of paper feed relay rollers 33, a paper feed relay path 34, a pair of paper ejection relay rollers 35, and a paper ejection relay path 36.

A large-capacity paper deck optional unit 40 for holding the recording paper S is equipped with a paper deck 41 which can be moved up and down, the recording paper S loaded on the deck being fed as necessary by using a group of paper deck feeding rollers 42. The paper deck optional unit 40 is also provided with a pair of paper feeding relay rollers 43 and a paper feeding relay path 44 for relaying the recording paper from other paper feeding optional unit, and a pair of paper ejection relay rollers 45 and a paper ejection relay path 46 for relaying the recording paper to a paper ejecting option. The paper deck optional unit 40 is controlled by a paper deck controller 102.

A sorting optional unit 50 is equipped with a plurality of paper ejection bins, a first bin 51, a second bin 52, a third bin 53, and a fourth bin 54; it sorts and loads the recording paper S on which recording has been completed. The recording paper S is sorted into the respective bins by a first flapper 55, a second flapper 56, a third flapper 57, and a fourth flapper 58. The sorting optional unit 50 is also provided with a pair of paper feeding relay rollers 61 and a paper feeding relay path 62 for relaying the recording paper fed from a paper feeding option, and a pair of paper ejection relay rollers 60 and a paper ejection relay path 59 for relaying the recording paper to be sent to other paper ejecting option. The sorting optional unit 50 is controlled by a sorter controller 103.

The supervising controller 101, the paper deck controller 102, and the sorter controller 103 are connected through an optional unit interface 70 for interconnection by connectors 71a, 71b and connectors 72a, 72b. The connectors 71a, 72a, and 73a are identical; the connectors 71b and 72b are also identical. It is accordingly possible to connect the paper deck optional unit 40 and the sorter optional unit 50 by switching their vertical positions. Owing to the configuration described above, when a user needs to connect optional units to the main body 1, the user has only to stack the required optional units and place the main unit 1 on them as illustrated in FIG. 2 to connect the connectors for communication and the carrying paths for the recording paper.

Figure 1:
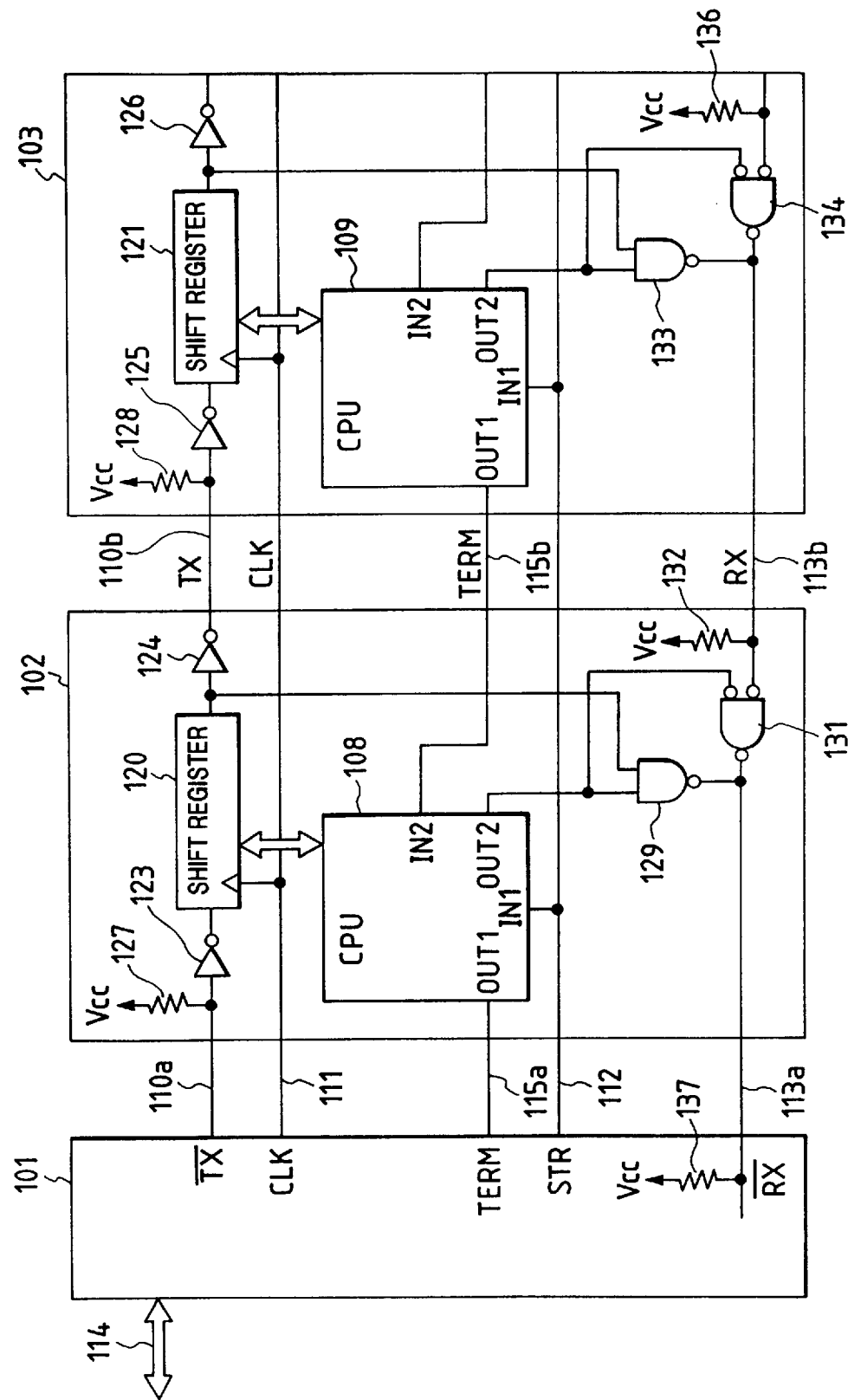
FIG. 1 is a circuit block diagram showing a serial communication apparatus in accordance with the present invention.

FIG. 1 is the circuit block diagram showing the serial communication apparatus in accordance with the present invention. One-chip microprocessors 108 and 109 control the operations of the optional units 40 and 50 and they also control the communication between the units. The serial communication apparatus includes serial transmission signal lines TX 110a, 110b, a serial clock signal line CLK 111, a strobe signal STR 112, serial signal receiving lines RX 113a, 113b, and sensor signal lines TERM 115a, 115b for sensing the operation statuses of downstream optional units. The serial communication apparatus further includes pull-up resistors 127, 128, 132, 136, and 137, receiving buffers 123, 125, transmitting drivers 124, 126, NAND circuits 129, 133, inverted AND circuits 131, 134, and shift registers 120, 121.

Figure 3:
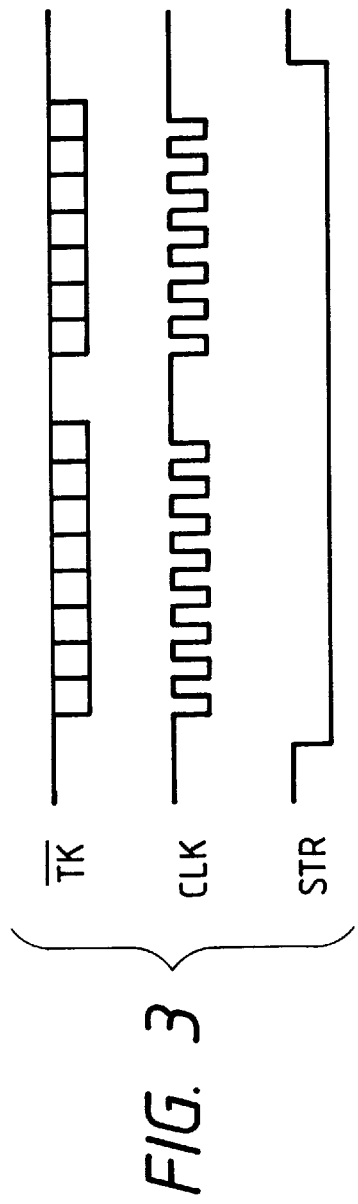
FIG. 3 is a time chart of the serial communication in accordance with the present invention.
Figure 4:
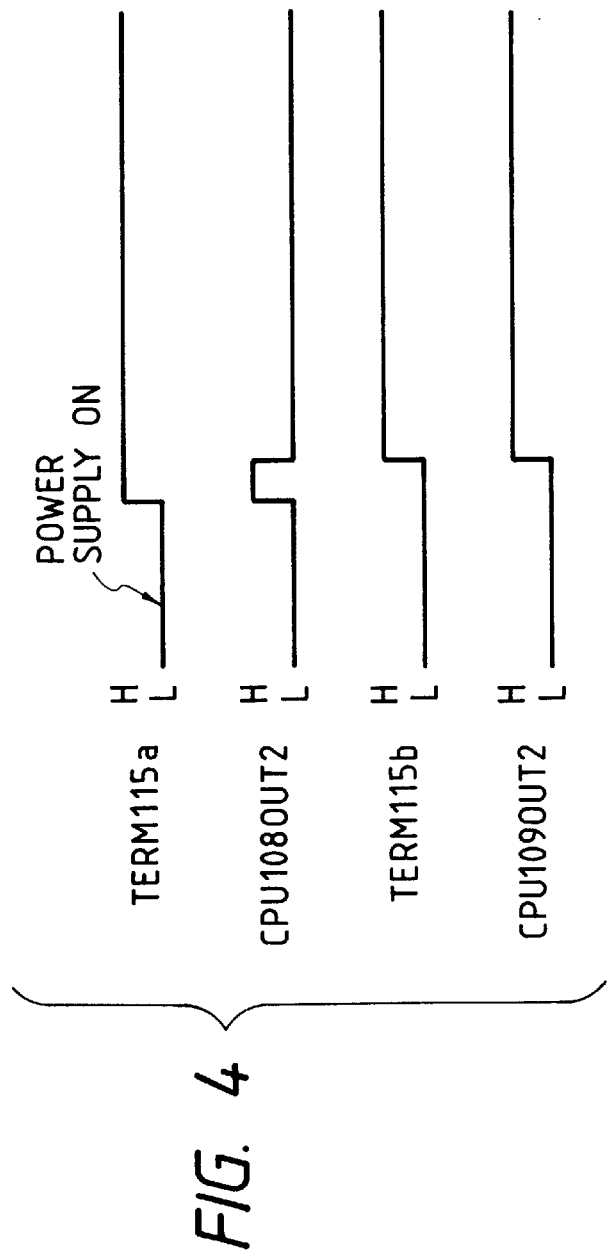
FIG. 4 is a time chart illustrating communication channel switching signals.

FIG. 3 is the time chart showing the states of the transmitted serial signals. The supervising controller encodes commands by using 8-bit serial signals for the controllers 102 and 103 and sends a set of bytes in a number corresponding to the number of the optional units to a TX line. The supervising controller sets the strobe STR 112 to low level immediately before transmission and informs the CPUs 108 and 109 of the start of the transmission. The controllers 102 and 103 of the respective optional units receive the signals through the receiving buffers 123 and 125, then capture them into the shift registers 120 and 121. The arranging order of the commands in a set of command strings corresponds to the order of connected commands. The shift registers 120, 121 shift the serial signals in synchronization with the clock signal CLK 111. Upon completion of the transmission of all TX signals, the supervising controller switches the level of the strobe signal STR 112 to high so as to capture the data, which has been put in the shift registers 120, 121, into the CPUs 108 and 109, respectively. When the CPUs 108 and 109 are initialized after the power is turned ON, they send the TERM signals to the upstream toward the supervising controller from themselves to announce that they are ready for communication. This is illustrated in FIG. 4.

As soon as the CPU 108 completes initialization thereof after the power is turned ON, it sends the TERM signal 115a from OUT1 to the supervising controller 101 to announce that it is ready for communication. At this time, if the CPU 108 finds through the TERM signal 115b that the CPU 109 of the unit 50, which is located on the downstream side from the CPU 108, has not yet been booted up, then it switches the output of OUT2 thereof to the high level so as to have the inverted AND circuit 131 cut off the signal of the signal line 113*b* coming from the downstream and also to make the NAND circuit 129 passable, thereby feeding the output of the shift register 120 back to the supervising controller 101. The serial signal receiving line 113*a* serves as the feedback path to the upstream, thus forming a loop from the TX line to the RX line.

Then, the CPU 109 of the optional unit 50 is booted up, causing the TERM signal 115*b* to be switched to the high level, and the CPU 108 receives it, causing the OUT2 to be switched to the low level. This, in turn, causes the NAND circuit 129 to cut off the signal from the shift register 120 and the inverted AND circuit 131 to let the signal from the controller 103 on the downstream side pass.

At this time, the CPU 109 sets the output of the OUT2 to the high level. This causes the NAND circuit 133 to let the output signal of the shift register 121 pass so that it is fed back to the controller 101 via the controller 102. Thus, a new loop of the TX line and the RX line is formed.

According to the configuration stated above, to turn the power of the optional controller 103 OFF while not in use and to turn the power of the optional controller 103 OFF only when necessary for the purpose of power saving, the loop can be automatically switched to change the state, wherein only the optional unit 40 is in operation, to the state, wherein the optional units 40 and 50 are in operation. This feature has achieved easier operation and the user no longer has to worry about the communication paths. Hitherto, a terminator must be changed or switch setting must be changed each time for the feedback of the serial signals.

In this serial communication method, when the supervising controller 101 issues the commands to the respective units, the CPUs 108 and 109 of the respective units take out the commands from the shift registers 120 and 121 when the strobe signal 112 switches to the high level, then they decode and execute the commands. The CPUs 108 and 109 replace the executed commands by the answers to the commands as the status data and load the status data in the shift registers 120 and 121. When the supervising controller 101 issues the next command, the data of the shift registers 120 and 121 is shifted by the clock 111 and captured by the supervising controller 101 through the RX line 113. Although the shift registers are provided on the TX line, it is obvious that they may be provided on the RX line instead. This applies to the embodiments to be discussed later.

(Second Embodiment)

Figure 5:
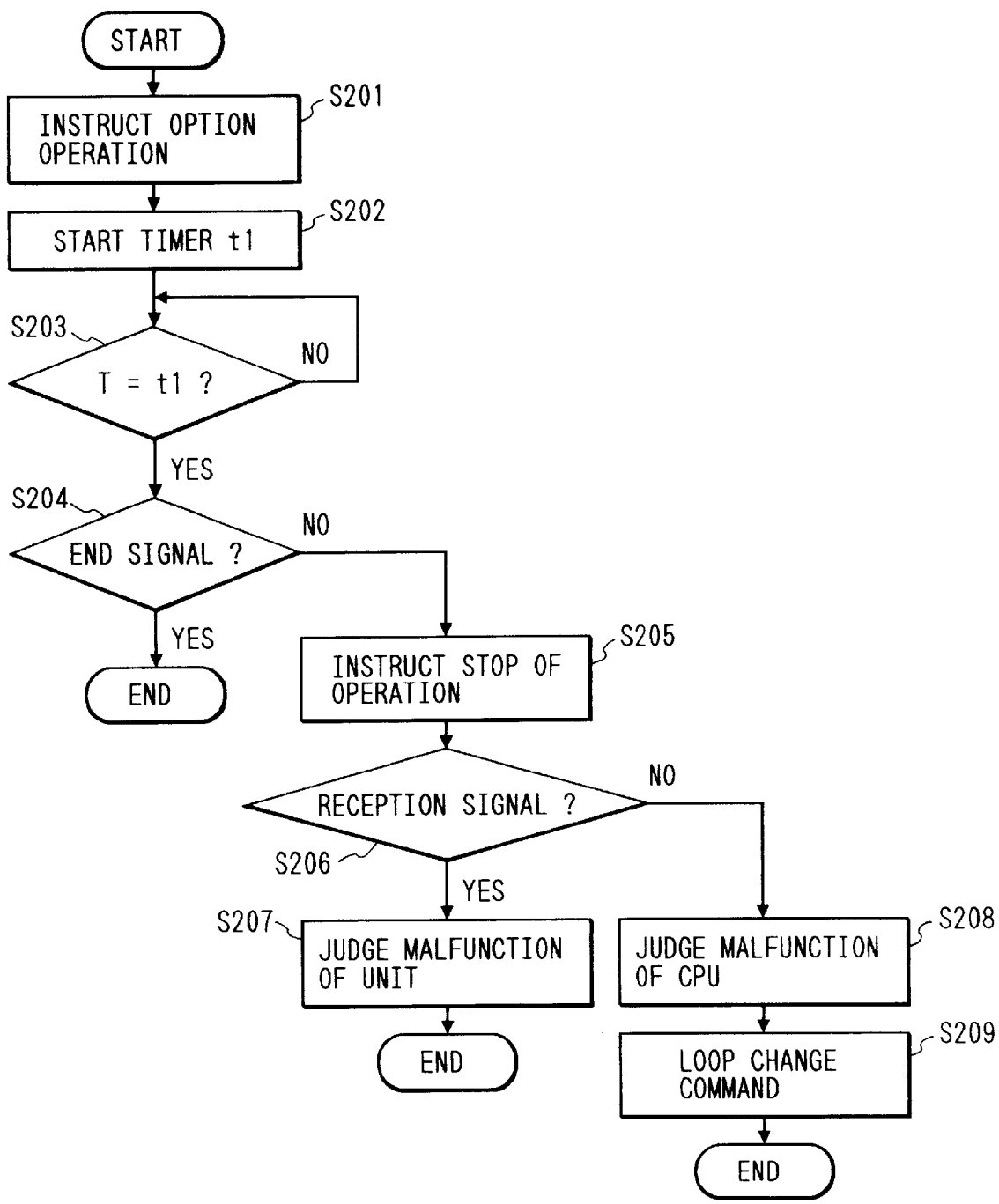
FIG. 5 is a flowchart illustrating a second embodiment.

The first embodiment has shown a method wherein the upstream CPUs judge the TERM signal which serves as the self-diagnosis signal for the downstream CPUs to form the communication loop. The second embodiment will refer to a method wherein the supervising controller 101 checks the states of the CPUs of the optional units while carrying out communication at the same time, thereby changing over the communication loop. The procedure is shown by the flowchart given in FIG. 5.

The supervising controller 101 sends a motor startup command to the controller 103 of the optional unit 50 (step S201). This causes the controller 103 to actuate a paper feed motor; in a predetermined time, it sends an end signal in response to an inquiry from the supervising controller 101 (step S202, step S203, and step S204). If the end signal is received in step S204, then the check process is terminated with no problem; if the end signal is not received, then an operation halt instruction command is sent to the optional unit 103 (step S205).

If a reception signal is sent back (step S206), then it is determined in step S207 that the unit is faulty. If no reception signal is sent back, then it is determined in step S208 that the CPU is faulty and a changeover command for the communication loop is sent in step S209 to the controller 102 of the unit 40 which is located one stage before the unit 50.

In response to the loop changeover command received from the supervising controller 101, the CPU 108 of the controller 102 located one stage before gives priority to the instruction from the supervising controller even if the TERM signal 115*b* is at the high level and it sets the output of OUT2 to the high level to cut off the RX signal 113*b* from the unit 103 and to make the NAND circuit passable, i.e. conductive, thereby switching the communication loop. This makes it possible to isolate an optional unit and automatically create a controllable loop even if the CPU of the optional unit should go out of control.

(Third Embodiment)

Figure 6:
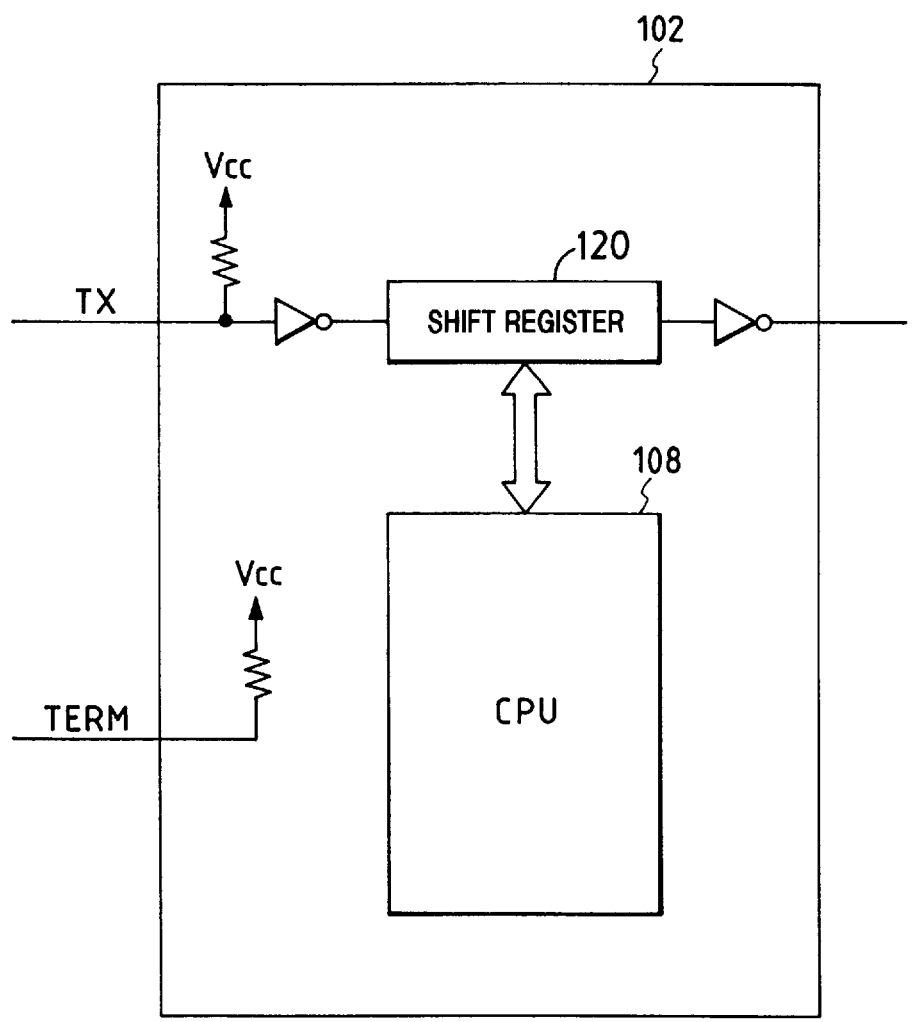
FIG. 6 is a circuit block diagram showing an optional unit according to a third embodiment.

FIG. 6 is the circuit block diagram of the optional unit according to the third embodiment. The TERM signal may be directly connected to a power line without the CPU 108 of the optional unit controller 102 between them and the line voltage may be applied to the upstream side to tell the upstream section whether the system is ready for communication. This embodiment is ideally used in a case wherein the number of available ports of the CPU 108 is limited or in other similar cases.

(Fourth Embodiment)

Figure 7:
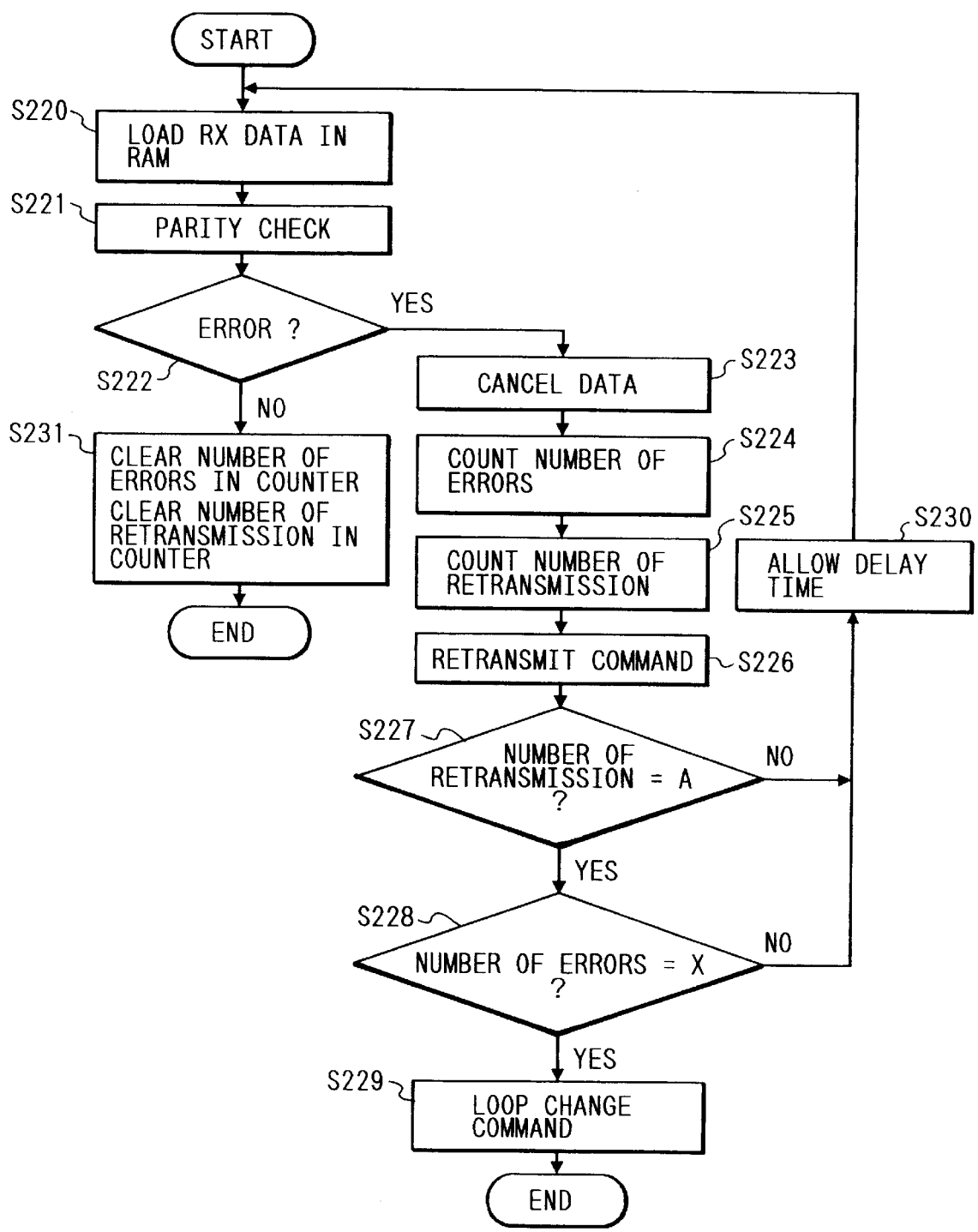
FIG. 7 is a flowchart illustrating a fourth embodiment.

The fourth embodiment refers to a loop switching method used when many serial signal errors occur. FIG. 7 shows the flowchart illustrating the procedure.

In step S220, the supervising controller captures received data into a built-in RAM. In step S221, parity check is conducted for each byte. If an error occurs in step S222, then a series of bytes thereafter including the byte which has incurred the error are all cancelled as errors in step S223. Parity errors are often attributable to noises in the clock CLK. One noise in the clock CLK triggers the dislocation in data thereafter bit by bit. Further dislocation by another bit caused by a noise results in a two-bit error, disabling the detection based on the parity check. Hence, cancelling the data mentioned above prevents the occurrence of an error of two or more bits.

In step S224, an error number counter is actuated. In step S225, a command retransmission number counter is actuated. In step S226, the command is retransmitted to the TX line. In step S227, it is checked whether the number of retransmissions has reached a predetermined number A.

When the number of retransmissions exceeds the predetermined number, if the number of errors exceeds the predetermined number X in step S228, then a command for isolating the unit, which is the farthest from the supervising controller, from the communication loop is issued in step S229.

If the predetermined number is not reached in steps S227 and S228, then the program goes back to step S220 after it takes a delay time of about 10 ms in step S230.

If it is determined that there is no error in step S222, then the error counter and the retransmission counter are cleared in step S231. Only the transmissions may be counted in step S225 and step S224: may be skipped.

(Fifth Embodiment)

Figure 8:
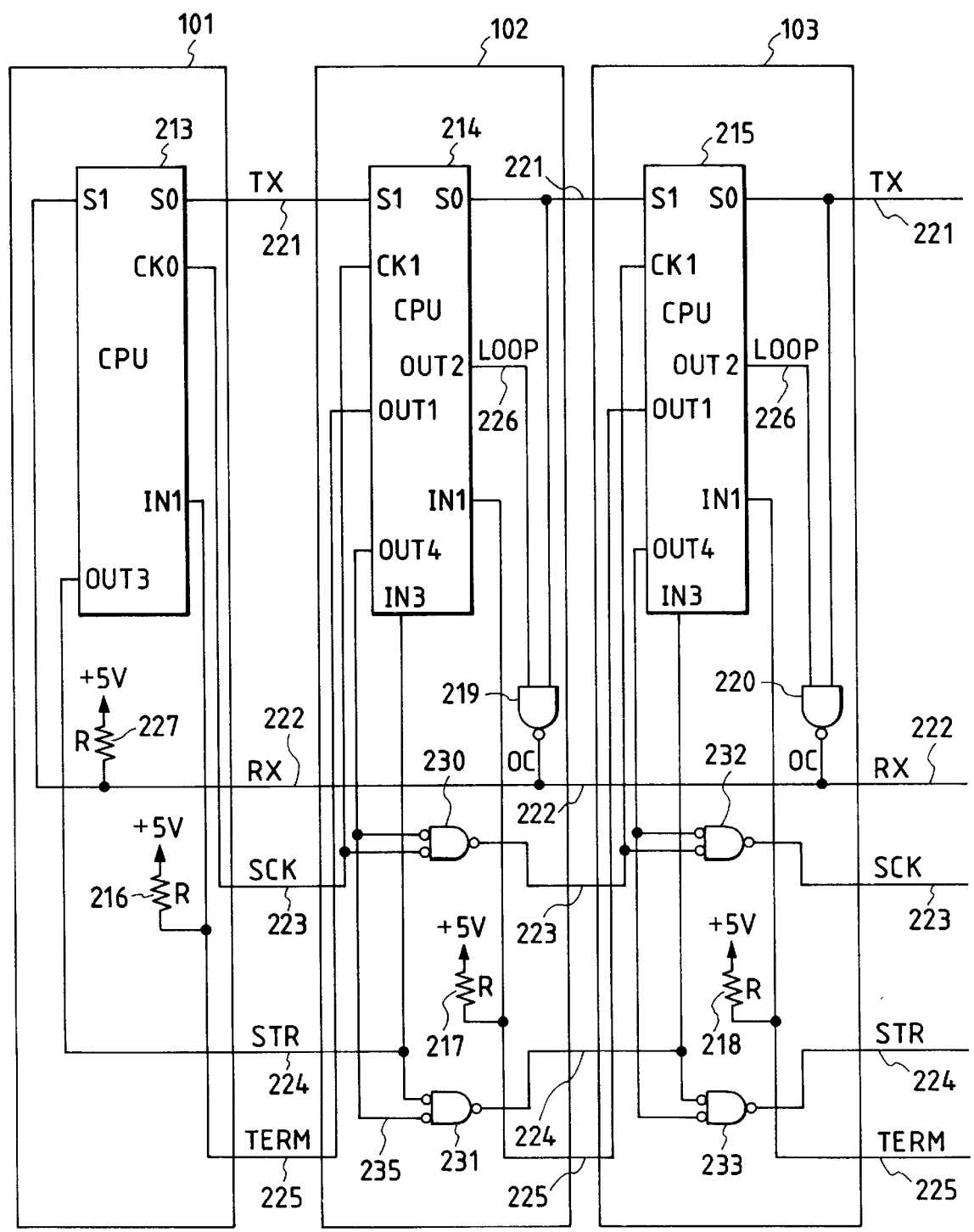
FIG. 8 is a diagram illustrating the connection for the serial communication according to a fifth embodiment of the present invention.

The fifth embodiment will now be described. The configuration thereof is the same as that of FIG. 2; the configurations of the controllers 101, 102, and 103 are shown in FIG. 8.

Reference numeral 213 denotes a CPU for communication control in the controller 101. Reference numeral 214 denotes a CPU for communication control in the controller 102. Reference numeral 215 denotes a CPU for communication control in the controller 103. Reference numerals 216, 217, and 218 denote resistors for pulling up a TERM signal 225. Reference numerals 219 and 220 denote NAND circuits with open-collector outputs for deciding TERMINATION, i.e. communication loop. Circuitry may be used wherein the NAND circuits 219 and 220 provide open drain outputs by using FETs or high-impedance outputs.

The embodiment further includes a communication data line TX 221, a communication data line RX 222 for loopback, a clock line SCK 223 for communication, a strobe signal STR 224 for controlling communication timing, and a signal TERM 225 for checking whether an adjoining connected unit is ready for communication.

The embodiment is further equipped with a signal LOOP 226 for deciding TERMINATION, a pull-up resistor 227 for the communication data line RX 222, low-active AND gates 230, 231, 232, and 233 for deciding whether the signals of the SCK 223 and the STR 224 should be transmitted to the next unit connected, and a signal ENB 235 for deciding ENABLE of a communication line.

The CPU 213 has a three-wire serial communication function; CK0 denotes a clock output terminal for the three-wire serial communication. SO denotes an outgoing data output terminal for the three-wire serial communication; SI denotes an incoming data input terminal for the three-wire serial communication. The CPU 213 has a standard I/O port; OUT3 issues the strobe signal STR 224 which is a communication control signal. An input port IN1 receives the TERM 225, which is a signal coming from an adjoining downstream unit, and also receives the connection state of the adjoining unit.

At OUT3, the STR 224 is set to TRUE when the communication is begun and the STR 224 is switched to FALSE when the transfer of data is completed, thereby controlling the transfer of data to and from a connected unit. At IN1, a LOW signal is supplied when an adjoining unit is connected and ready for communication.

The CPUs 214, 215 have three-wire serial communication functions; CK1 denotes a clock input terminal for the three-wire serial communication. The functions of SO and SI are the same as those of the CPU 213. The CPUs 214, 215 have standard I/O ports. The port OUT1 issues the TERM 225 which is the signal for informing an adjoining unit of the CPUs 214, 215 being ready for communication.

The port OUT2 issues the signal LOOP 226 for deciding TERMINATION. The port OUT4 issues the signal ENB 235 for deciding ENABLE of a communication line. The port IN1 has the same function as that of the CPU 213. The port IN3 receives the strobe signal STR 224 issued by the CPU 213.

When OUT1 becomes ready for communication, it sends the LOW signal to an upstream controller. Setting OUT2 to HIGH opens the NAND gates 219, 220 and connects data output SO from the CPU 214, 215 to the communication data line RX 222, so that the data is transmitted to the CPU 213. Setting OUT2 to LOW closes the NAND gates 219, 220, so that data output SO from the CPU 214, 215 is transmitted to the next unit via the TX 221 and the line RX 222 is put in a state where no signal is accepted.

Setting OUT4 to LOW opens the gates 230, 231, causing the signals SCK 223 and STR 224 to be transmitted to the next connected unit. Setting OUT4 to HIGH closes the gates 230, 231, so that the signals SCK 223 and STR 224 are no longer issued. Under this condition, even if a unit with the power thereof turned ON is connected under the unit, the communication between the unit and the option supervising unit is not affected at all.

Figure 9:
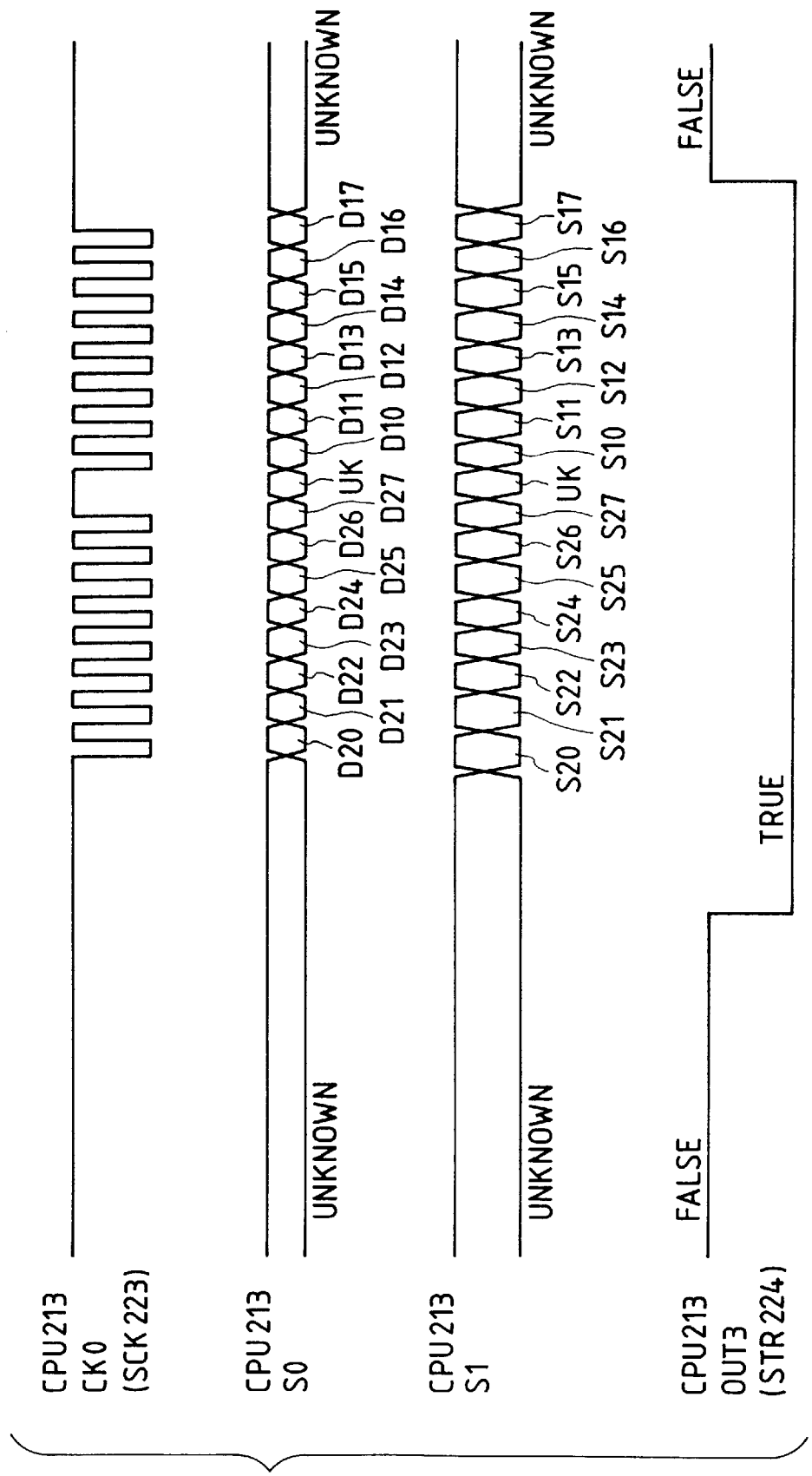
FIG. 9 is a timing chart of the communication according to the fifth embodiment.

FIG. 9 is the timing chart of the communication in FIG. 8. FIG. 9 shows a state wherein a command has been issued by the controller 101 of the unit 32 to the unit 40 and the unit 50. The command consists of 8-bit data; D20 through D27 denote the commands issued to the controller 103; and D10 through D17 denote the commands issued to the controller 102.

The controller 101 sends out the aforesaid commands in synchronization with the clock SCK 223. In order to indicate that two commands, namely, 16 bits, form one communication, the CPU 213 sets the strobe STR 224 to TRUE prior to the clock SCK 223 and it sets the strobe STR 224 to FALSE upon completion of the clocks for the 16 bits. At the same time, the connected unit 50 returns the statuses of S220 through S227 and the connected unit 40 returns the statuses of S210 through S217 through a signal line RX 222. This series of operations causes the controller 101 to issue commands to the controllers of the respective connected units and the controllers of the respective connected units to return the statuses to the controller 101.

Figure 10:
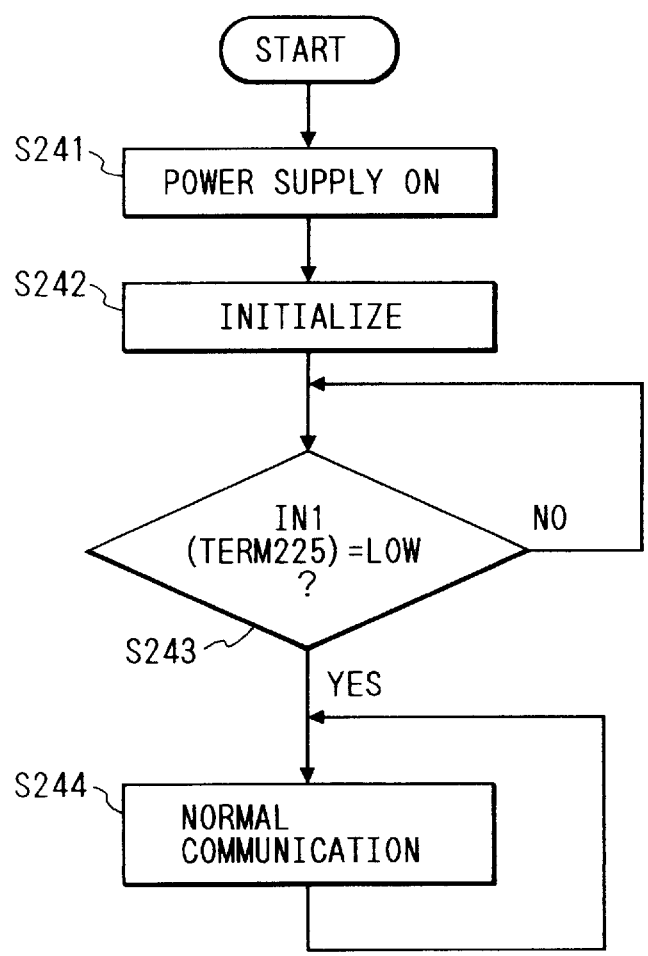
FIG. 10 is a flowchart illustrating the operation of a CPU in the fifth embodiment.

FIG. 10 shows the flowchart illustrating the operation of the CPU 213. When the controller 101 of the option supervising unit 32 is turned ON (step S241), the CPU 213 starts operation and performs initialization (step S242); then it receives the TERM 225 from an adjoining unit and waits until communication is enabled (step S243). As soon as the communication is enabled (step S243), the CPU 213 performs normal communication (step S244).

Figure 11:
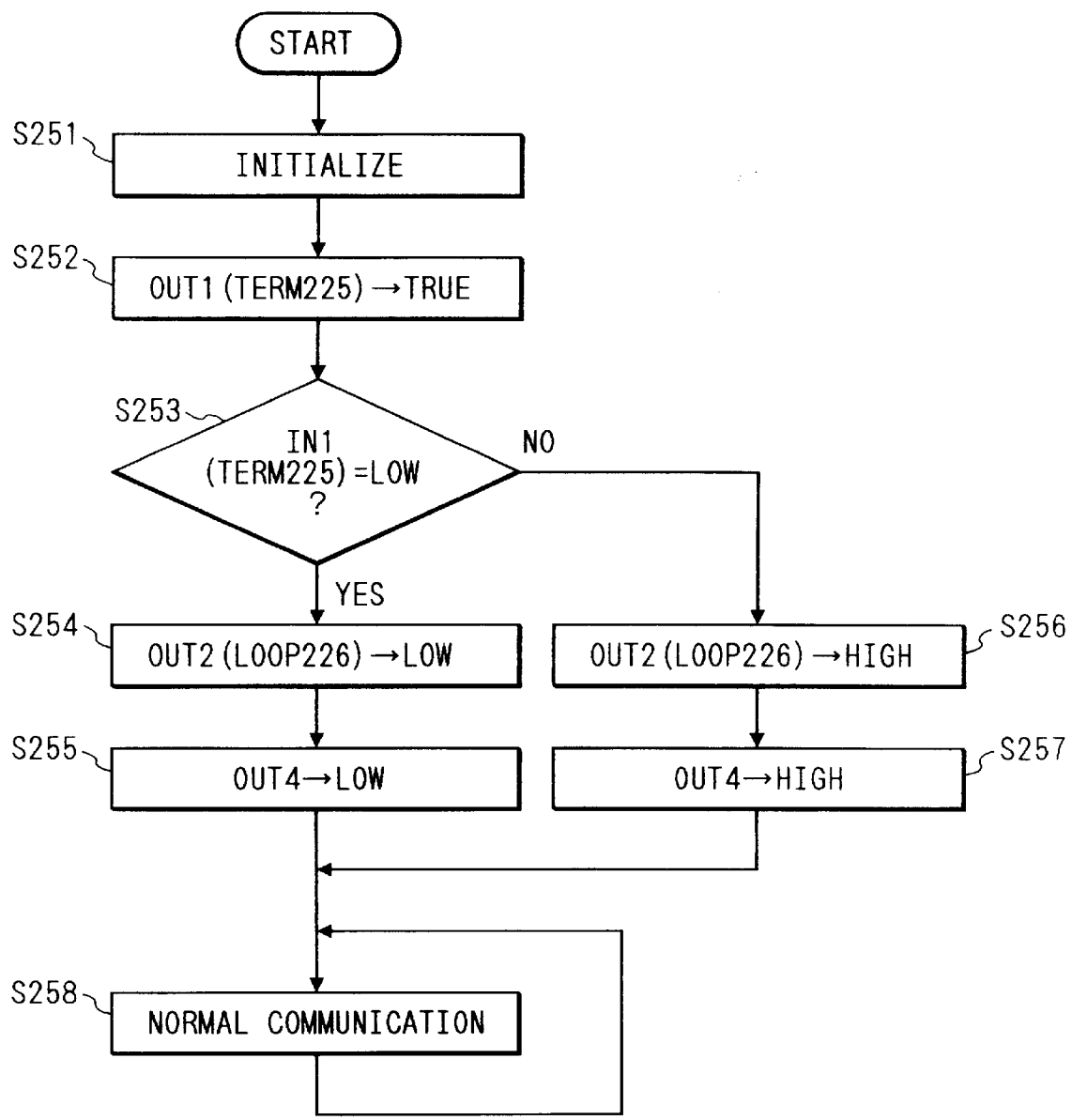
FIG. 11 is a flowchart illustrating the operation of another CPU in the fifth embodiment.

FIG. 11 shows the flowchart illustrating the operation of the CPU 215. The CPU carries out initialization (step S251); it issues the LOW signal to OUT1 (TERM 225) (step S252) to tell an adjoining unit that it is ready for communication.

Then, the connection status of the adjoining unit is received through IN1. If IN1 is LOW (step S253), then it means that the adjoining unit is ready for communication; therefore, the LOW signal is issued to OUT2 (LOOP 226) (step S254). Thus, the output signal SO is issued to the TX 221 to be transmitted to the next unit.

In the next step, OUT4 (ENB 235) is switched to LOW (step S255). This causes the signals SCK 223 and STR 224 to be transmitted to the next unit. If the value received through IN1 is HIGH (step S253), then LOOP 226 is set to HIGH (step S256) and the output signal SO is output to the RX 222, thereby forming the loop-back. The NAND circuits 219, 220 which drive the RX lines have open collectors; therefore, even if both NAND circuits 219 and 220 should turn ON at the same time, they do not damage each other. The port OUT4 (ENB 35) is then set to HIGH to set the output signals SCK 223 and STR 224 to FALSE, thereby disabling the transmission to the next unit (step S257). After this series of operation, the CPUs 214 and 215 begin normal communication (step S258).

(Sixth Embodiment)

Figure 12:
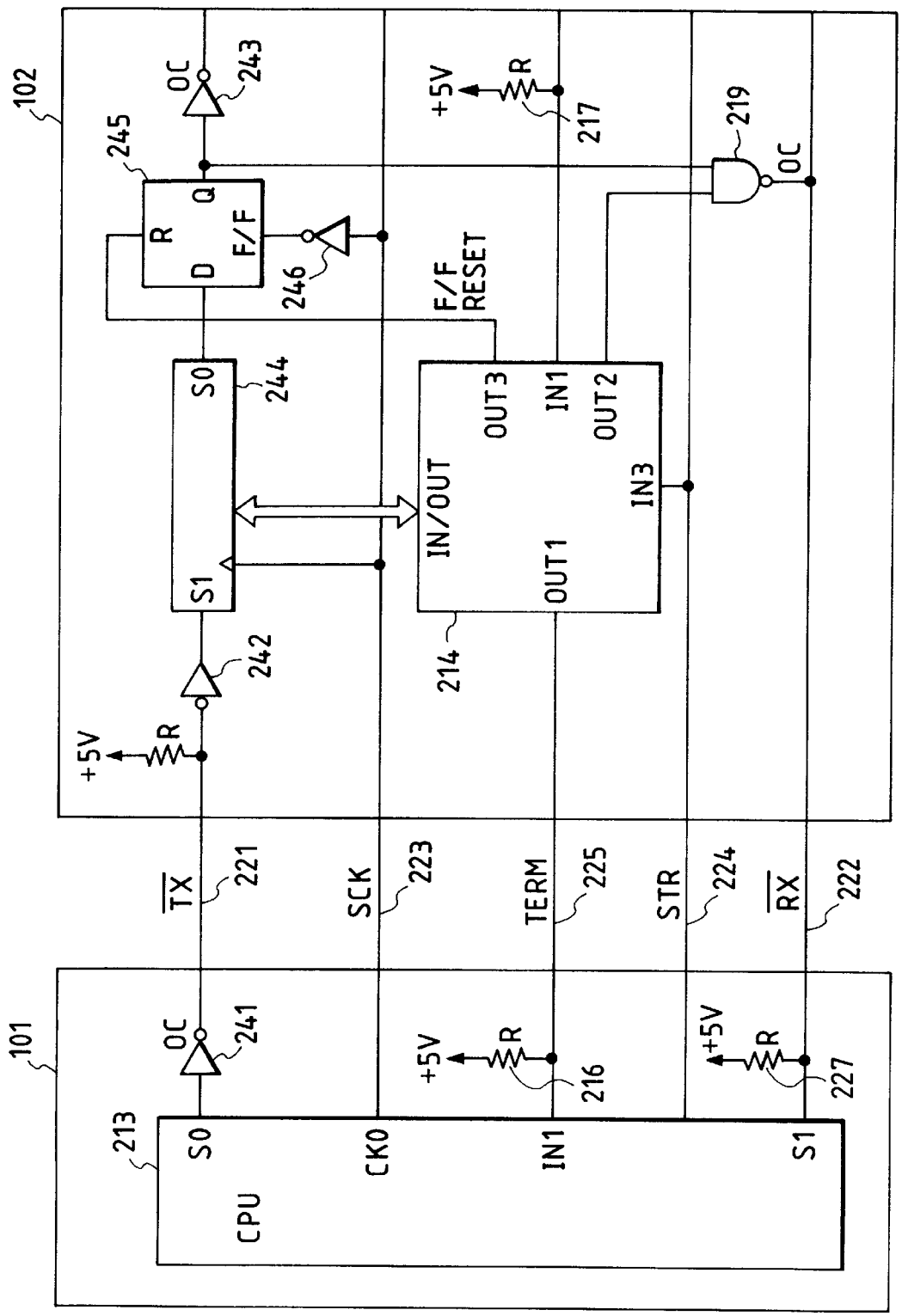
FIG. 12 is a diagram illustrating the connection for the serial communication according to a sixth embodiment.

FIG. 12 is the circuit diagram of the sixth embodiment. The controller 103 of the optional unit 50 is omitted. Drivers 241, 243 and a receiver 242 for the serial signal lines have been added to the sixth embodiment, the drivers 241, 243 having open collectors. For the purpose of clarity, a shift register 244 is shown separately from the CPU 214 in this embodiment, whereas it is included in the CPU 214 in the previous embodiments. A flip-flop 245 is phase-shifted by half a clock by SCK 223 and an inverter 246.

Figure 13:
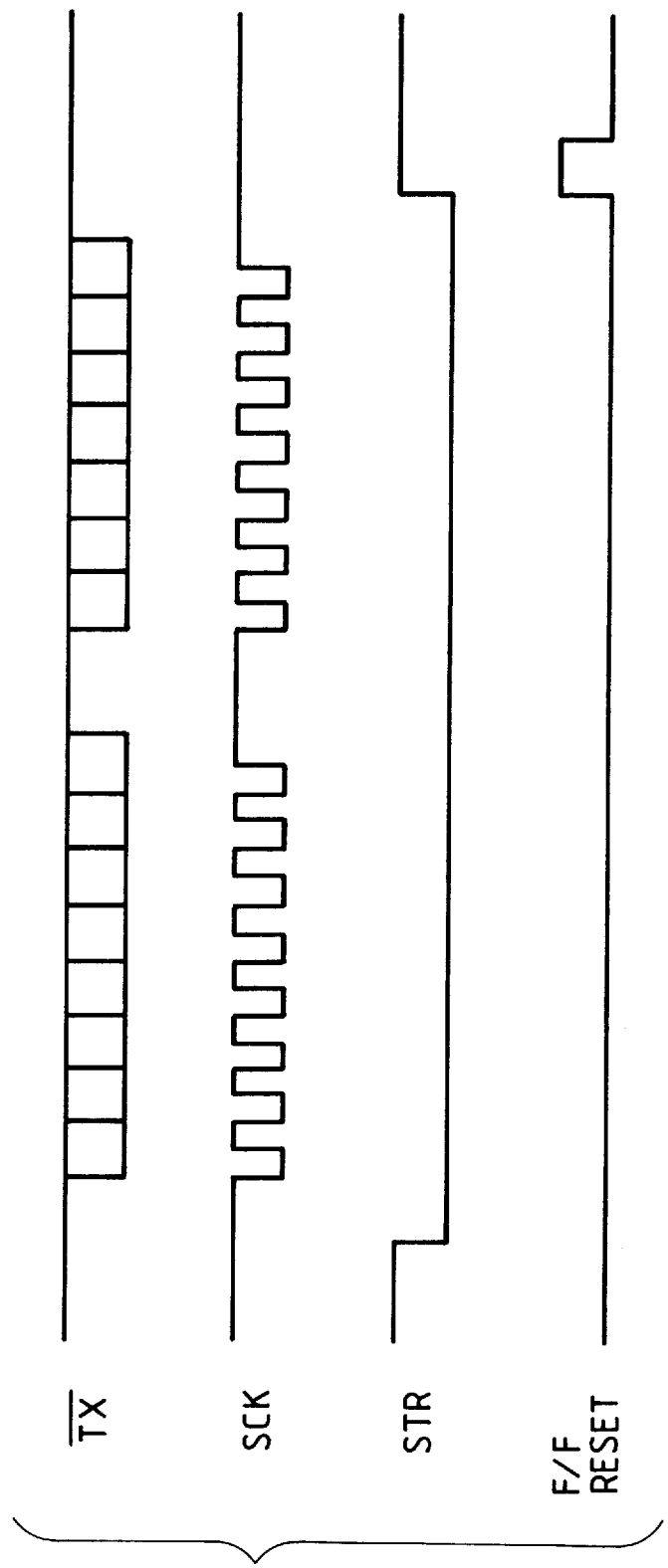
FIG. 13 is a timing chart illustrating the communication according to the sixth embodiment.

The signal transmission timing of the TX signal 221 is shown in FIG. 13; the TX signal 221 is transferred in synchronization with the clock SCK 223. The strobe signal 224 switches to HIGH upon completion of the transmission of the serial signals. The switch to HIGH is detected through IN3 of the CPU 214 and the reset signal of the flip-flop 245 is issued. This forcibly switches the output Q of the flip-flop 245 to the low level.

Sending out the low-level output Q from an inverting driver 243 sets the output of the driver 243 to the high level. The driver 243 provides open-collector outputs; therefore, when the output of the driver is set to the high level, the driver no longer draws in currents from an optional unit 212, leading to nearly zero collector current.

The serial signal line stays in a state, wherein no signal is being transmitted through, longer than in a state wherein signals are being transmitted through. This feature provides significant power saving effect when the currents drawn by the driver 243, to which large currents are supplied in order to reduce the line impedance for controlling noises, is nulled.

(Seventh Embodiment)

Figure 14:
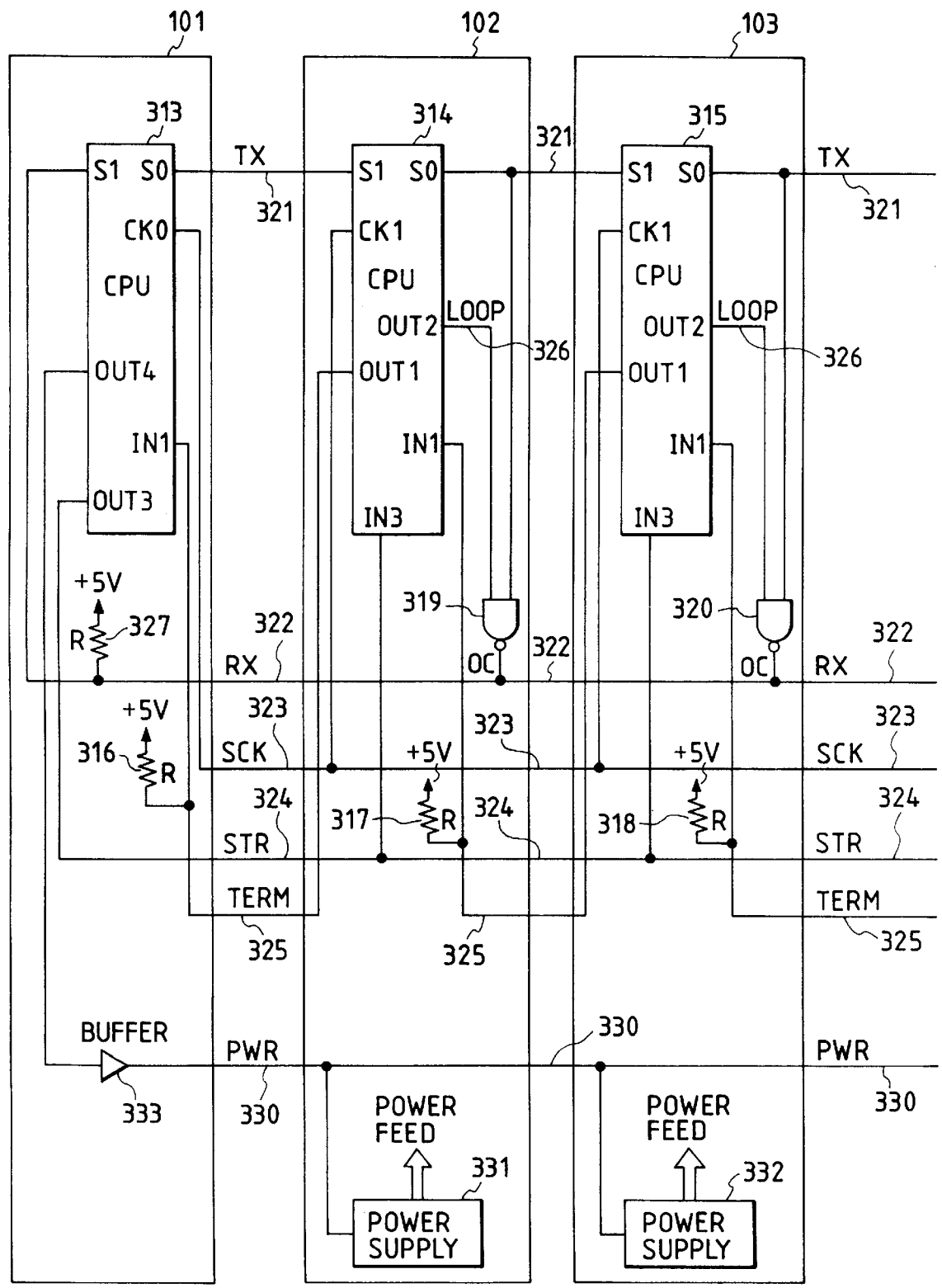
FIG. 14 is a diagram illustrating the connection for the serial communication according to a seventh embodiment of the present invention.

The seventh embodiment will now be described. The configuration of this embodiment is identical to that shown in FIG. 2. The configurations of the controllers 101, 102, and 103 are shown in FIG. 14.

The embodiment includes a CPU 313 for communication control in the controller 101; a CPU 314 for communication control in the controller 102; and a CPU 315 for communication control in the controller 103.

The embodiment further includes resistors 316, 317, and 318 for pulling up a TERM signal 325; NAND circuits 319 and 320 with open-collector outputs for deciding TERMINATION; a communication data line TX 321; a communication data line RX 322 for loop-back; a clock line SCK 323 for communication; a strobe signal STR 324 for controlling communication timing; and a signal TERM 325 for checking whether an adjoining connected unit is ready for communication.

The embodiment is further equipped with a signal LOOP 326 for deciding TERMINATION; a pull-up resistor 327 for the communication data line RX 322; a signal PWR 330 for controlling the power supply of a connected unit; a power supply 331 for feeding power to the unit 40; a power supply 332 for feeding power to the unit 50; and a buffer 333 for driving a signal PWR 330.

The CPU 313 has a three-wire serial communication function; CK0 denotes a clock output terminal for the three-wire serial communication. SO denotes an outgoing data output terminal for the three-wire serial communication; SI denotes an incoming data input terminal for the three-wire serial communication. The CPU 313 has a standard I/O port; OUT3 issues the strobe signal STR 324 which is a communication control signal. IN1 denotes an input port which receives the TERM 325, which is a signal coming from an adjoining downstream unit, and receives the connection state of the adjoining unit.

The output port OUT4 issues a signal for controlling the power supply of a connected unit. The low-level signal is applied to the input port IN1 when the adjoining unit has been connected and ready for communication. The STR 324 is set to TRUE when the communication is begun and the STR 324 is switched to FALSE when the transfer of data is completed, thereby controlling the transfer of data to and from the connected unit.

Setting OUT4 to HIGH turns ON the power of the respective connected units through the PWR 330; setting OUT4 to LOW turns OFF the power of the respective connected units. The CPUs 314, 315 have three-wire serial communication functions; CK1 denotes a clock input terminal for the three-wire serial communication. The functions of SO and SI are the same as those of the CPU 313.

The CPUs 314, 315 have standard I/O ports. The port OUT1 issues the TERM 325 which is the signal for informing an adjoining unit that the CPUs 314, 315 are ready for communication. The port OUT2 issues the signal LOOP 326 for deciding TERMINATION. The port IN1 has the same function as that of the CPU 313.

The port IN3 receives the strobe signal STR 324 issued by the CPU 313. When OUT1 becomes ready for communication, it sends out the LOW signal. Setting OUT2 to HIGH opens the NAND gates 319, 320 and connects data output SO from the CPU 314, 315 to the communication data line RX 322, so that the data is transmitted to the CPU 313.

Setting OUT2 to LOW closes the NAND gates 319, 320, so that data output SO from the CPUs 314, 315 is transmitted to the next unit via the TX 321 and the line RX 322 is put in a state where no signal is accepted.

Figure 15:
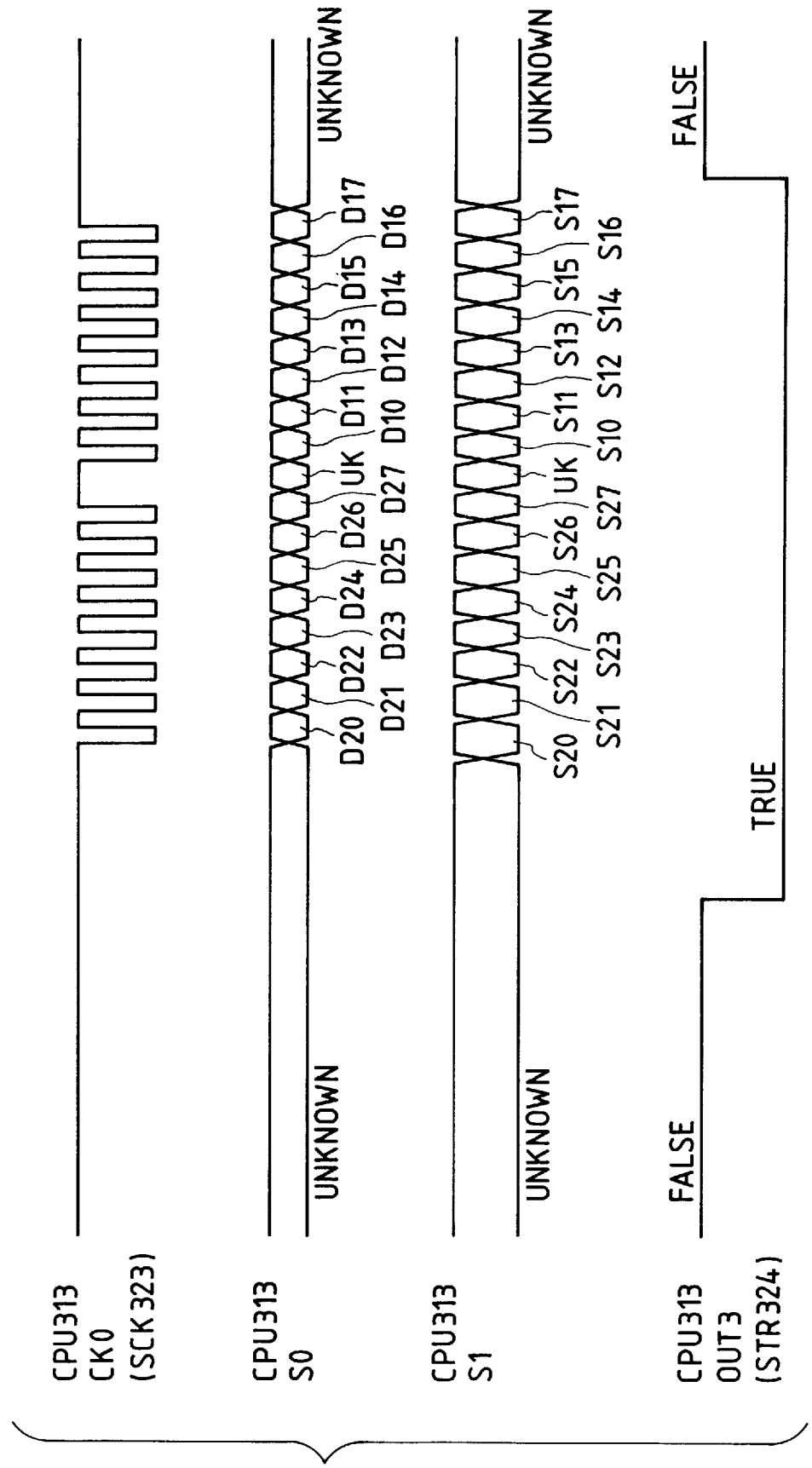
FIG. 15 is a timing chart illustrating the communication according to the seventh embodiment of the present invention.

FIG. 15 is the timing chart of the communication in this embodiment. FIG. 15 shows a state wherein a command has been issued by the controller 101 to the controllers 102 and 103. The command consists of 8-bit data; D20 through D27 denote the commands issued to the controller 103; and D10 through D17 denote the commands issued to the controller 102. The controller 101 sends out the aforesaid commands in synchronization with the clock SCK 323. In order to indicate that two commands, namely, 16 bits, form one communication, the CPU 313 sets the strobe STR 324 to TRUE prior to the clock SCK 323 and it sets the strobe STR 324 to FALSE upon completion of the clocks for the 16 bits. At the same time, the controller 103 returns the statuses of S320 through S327 and the controller 102 returns the statuses of S310 through S317 through a signal line RX 322. This series of operations causes the controller 101 to issue commands to the respective connected units and the respective connected units to return the statuses to the controller 101.

Figure 16:
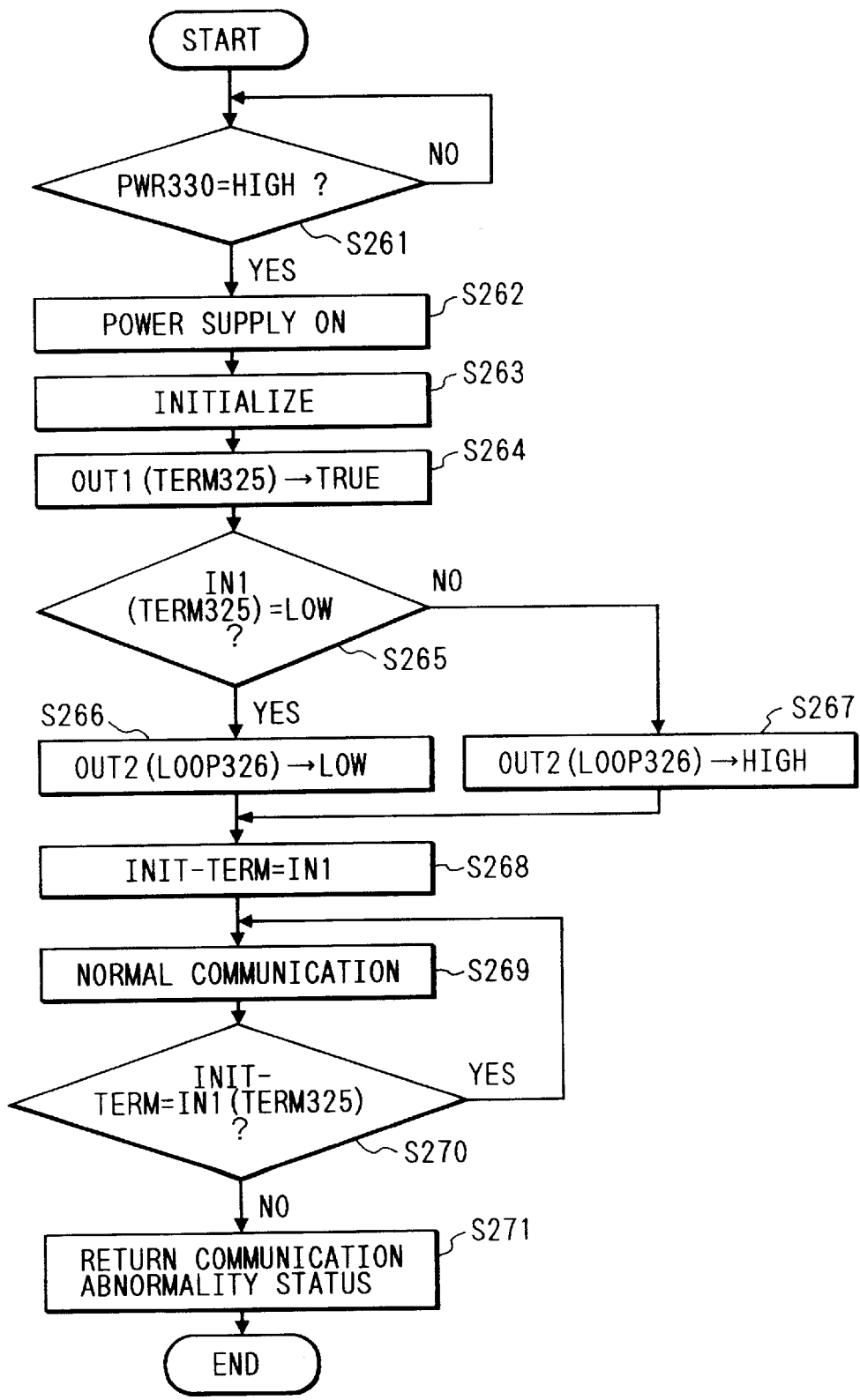
FIG. 16 is a flowchart illustrating the operations of CPUs 14 and 15 in the seventh embodiment of the present invention.

FIG. 16 shows the flowchart illustrating the operation of the CPUs 314, 315. Steps S261 and S262 are not a part of the flowchart illustrating the internal operation of the CPUs 314 and 315; they indicate the statuses of the power supplies 331 and 332 in the controllers 102 and 103. Steps S263 through S271 constitute the flowchart of the internal operations of the CPUs 314 and 315.

The controllers 102 and 103 are power-OFF and inactive until the PWR 330 goes HIGH (step S261). As soon as the PWR 330 switches to HIGH (step S261), the power supplies 331 and 332 are turned ON and power feed is begun (step S262). Upon the start of the power feed, the CPUs 314 and 315 perform initialization (step S263). When the CPUs 314 and 315 are ready for communication, OUT1 is set to TRUE to tell an adjoining unit that they are ready for communication (step S264). Then the CPUs 314 and 315 receive the connection status of the adjoining unit through IN1 (step S265) and set the LOOP 326 to LOW (step S266) if IN1 indicates LOW, then they send the output signal SO to the TX 321. If IN1 indicates HIGH (step S265), then the CPUs set the LOOP 326 to HIGH (step S267) and send the output signal SO to the RX 322 for loop-back. At this time, the value at IN1 is stored in variable INIT-TERM (step S268). Thus, the connection status is stored.

After that, the CPUs 314 and 315 begin normal communication (step S269). The CPUs 314 and 315 compare the stored connection status INIT-TERM with the input at IN1 (step S270) and, if they found no change, then they resume the normal communication (step S269). If the CPUs detect any change (step S270), then they return a communication abnormality status to the controller 101 (step S271). Then, the CPUs 314 and 315 terminate the operation (step S272).

Figure 17:
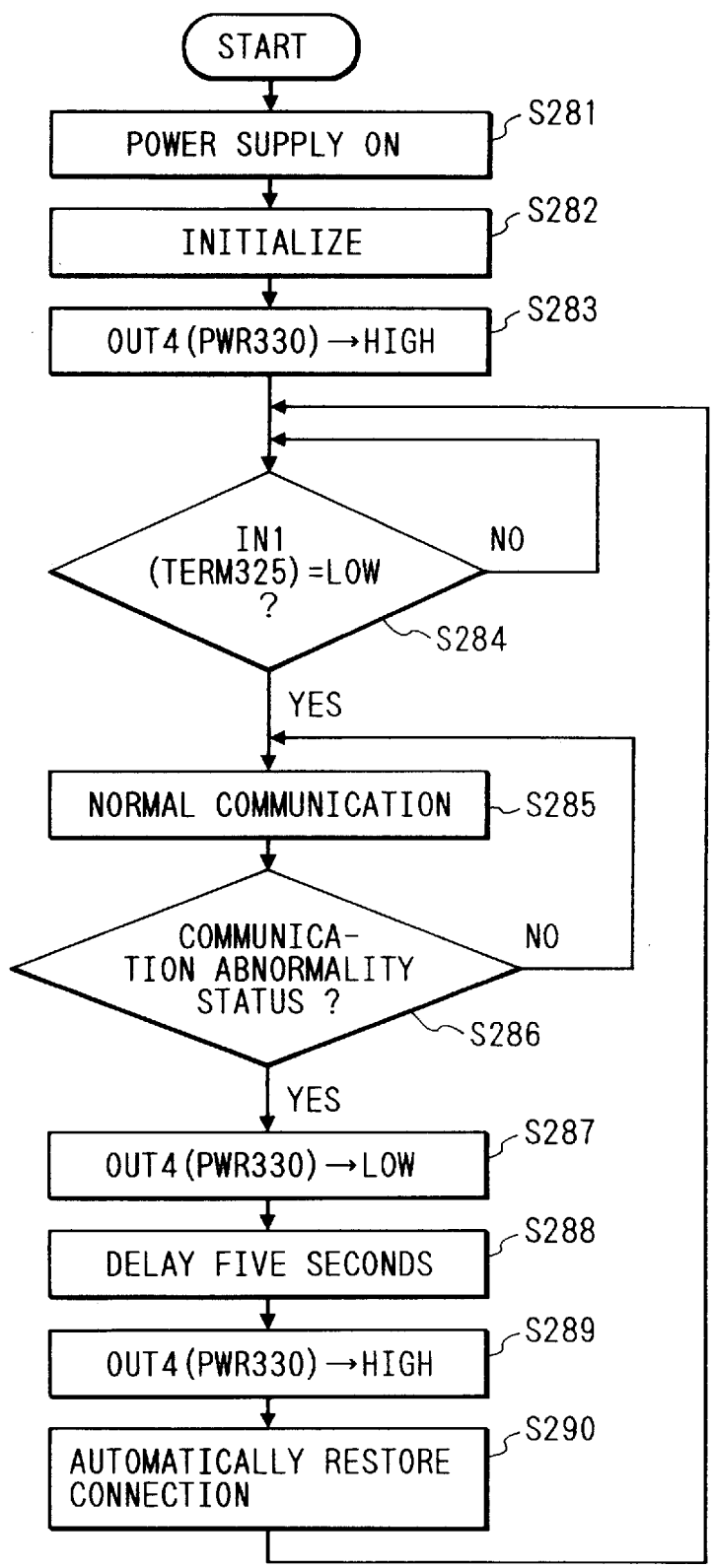
FIG. 17 is a flowchart illustrating the operation of a CPU 13 in the seventh embodiment of the present invention.

FIG. 17 shows the flowchart illustrating the operation of the CPU 313. When the controller 101 is turned ON (step S281), the CPU 313 starts operation and performs initialization (step S282), then it sets OUT4 (PWR 330) to HIGH (step S283) to turn ON the power of the respective connected units.

In the next step, the CPU 313 receives the TERM 325 from an adjoining unit and waits until communication is enabled (step S284). After that, the CPU 313 performs normal communication (step S285); and checks whether a communication abnormality status has been returned from any connected unit (step S286) and if it finds no communication abnormality (step S286) it continues the normal communication (step S285).

If a communication abnormality status is returned from a connected unit (step S286), then the CPU 313 sets OUT4 (PWR 330) to LOW to turn OFF the power of the connected unit (step S287) and waits for five seconds until the power feed to the connected unit is completely stopped (step S288). Then the CPU 313 sets OUT4 (PER 330) to HIGH again to turn ON the power of the connected unit (step S289). After that, the CPU 313 performs the processing for automatically restoring the connection (step S290), then it waits until the communication is enabled (step S284) before resuming the normal communication (step S285).

(Eighth Embodiment)

Figure 18:
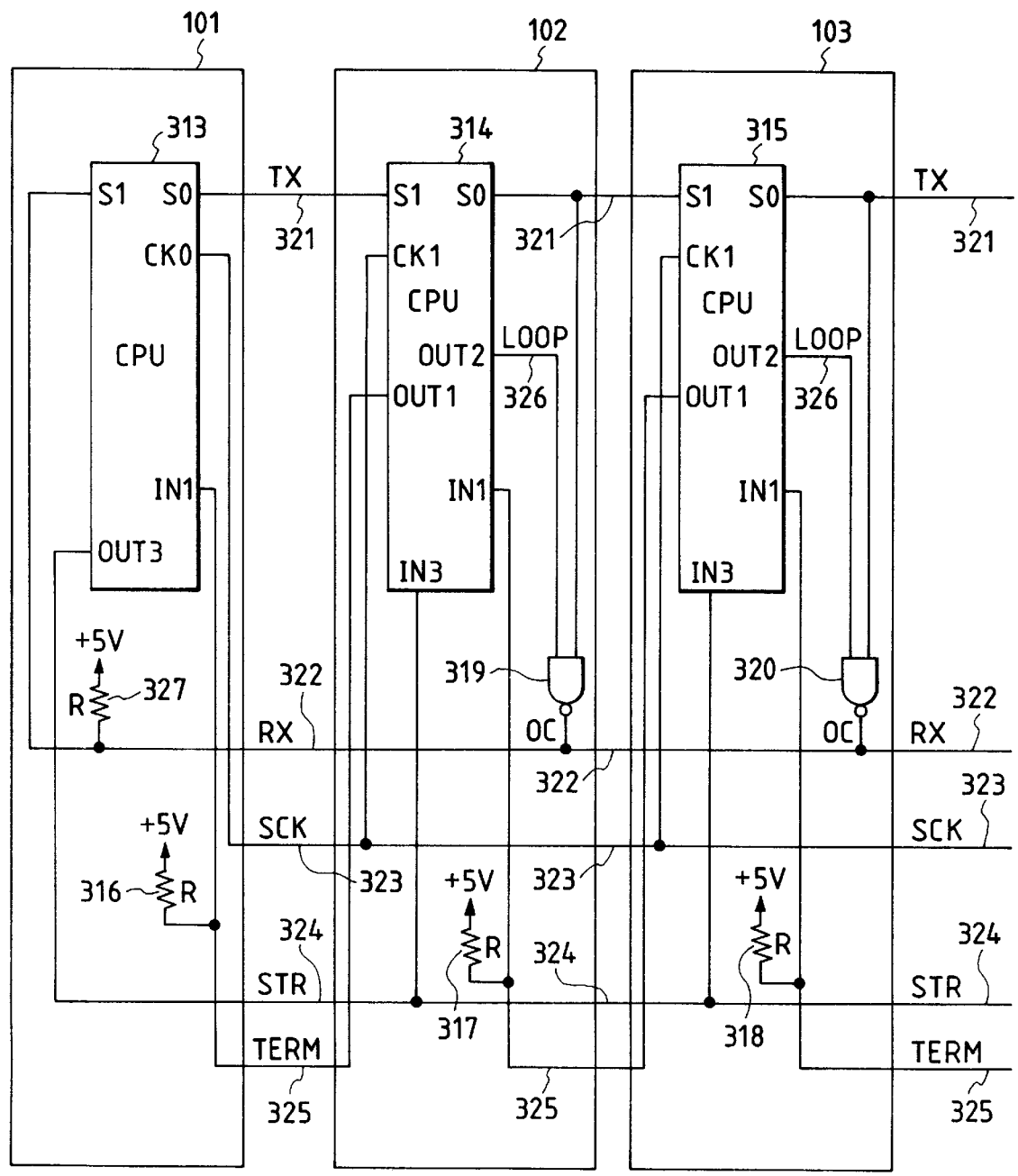
FIG. 18 is a diagram illustrating the connection for the serial communication according to an eighth embodiment of the present invention.
Figure 19:
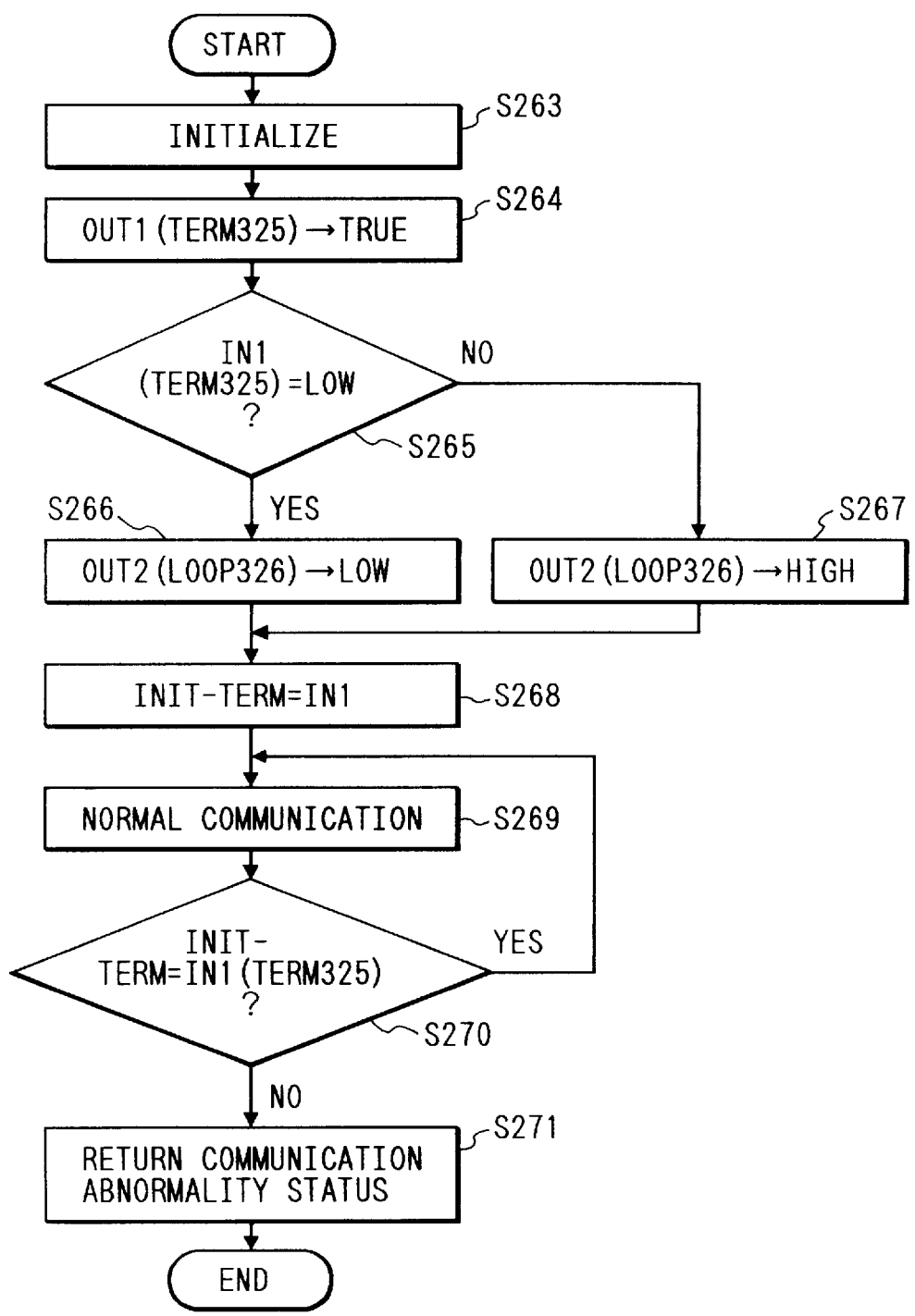
FIG. 19 is a flowchart illustrating the operations of the CPUs 14 and 15 in the eighth embodiment of the present invention.
Figure 20:
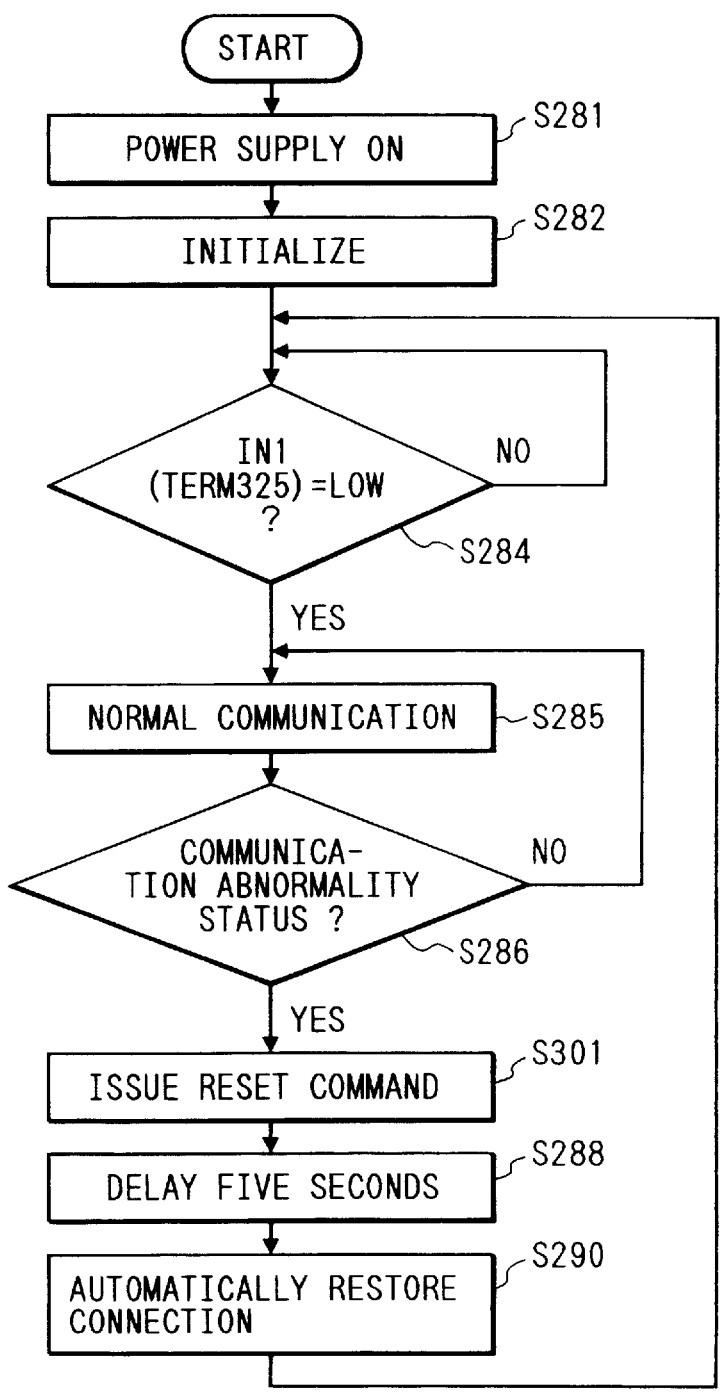
FIG. 20 is a flowchart illustrating the operation of the CPU 13 in the eighth embodiment of the present invention.

The eighth embodiment is basically comprised of the seventh embodiment shown in FIG. 14 from which the PWR 330, the power supply 331, the power supply 332, and the buffer 333 have been removed (FIG. 18). The communication timing chart of the eighth embodiment is identical to that shown in FIG. 15. FIG. 19 shows the flowchart illustrating the operation of the CPUs 314 and 315 of this embodiment. The operation of the CPUs 314 and 315 is the same as that shown in FIG. 16 except that the controller 101 does not decide the turning ON of the power. FIG. 20 shows the flowchart illustrating the operation of the CPU 313.

When the controller 101 is turned ON (step S281), the CPU 313 starts operation and performs initialization (step S282), then it receives the TERM 325 from an adjoining unit and waits until communication is enabled (step S284). After that, the CPU 313 performs normal communication (step S285) and checks whether a communication abnormality status has been returned from any connected unit (step S286).

If a communication abnormality status is returned from a connected unit (step S286), then the CPU 313 issues a reset command to the connected unit (step S301) and waits for five seconds (step S288) until the respective connected units complete initialization.

In the next step, the CPU 313 performs the processing for automatic restoration of the connected unit (step S290); it waits until the communication is enabled (step S284) and resumes the normal communication (step 5285).

(Ninth Embodiment)

Figure 21:
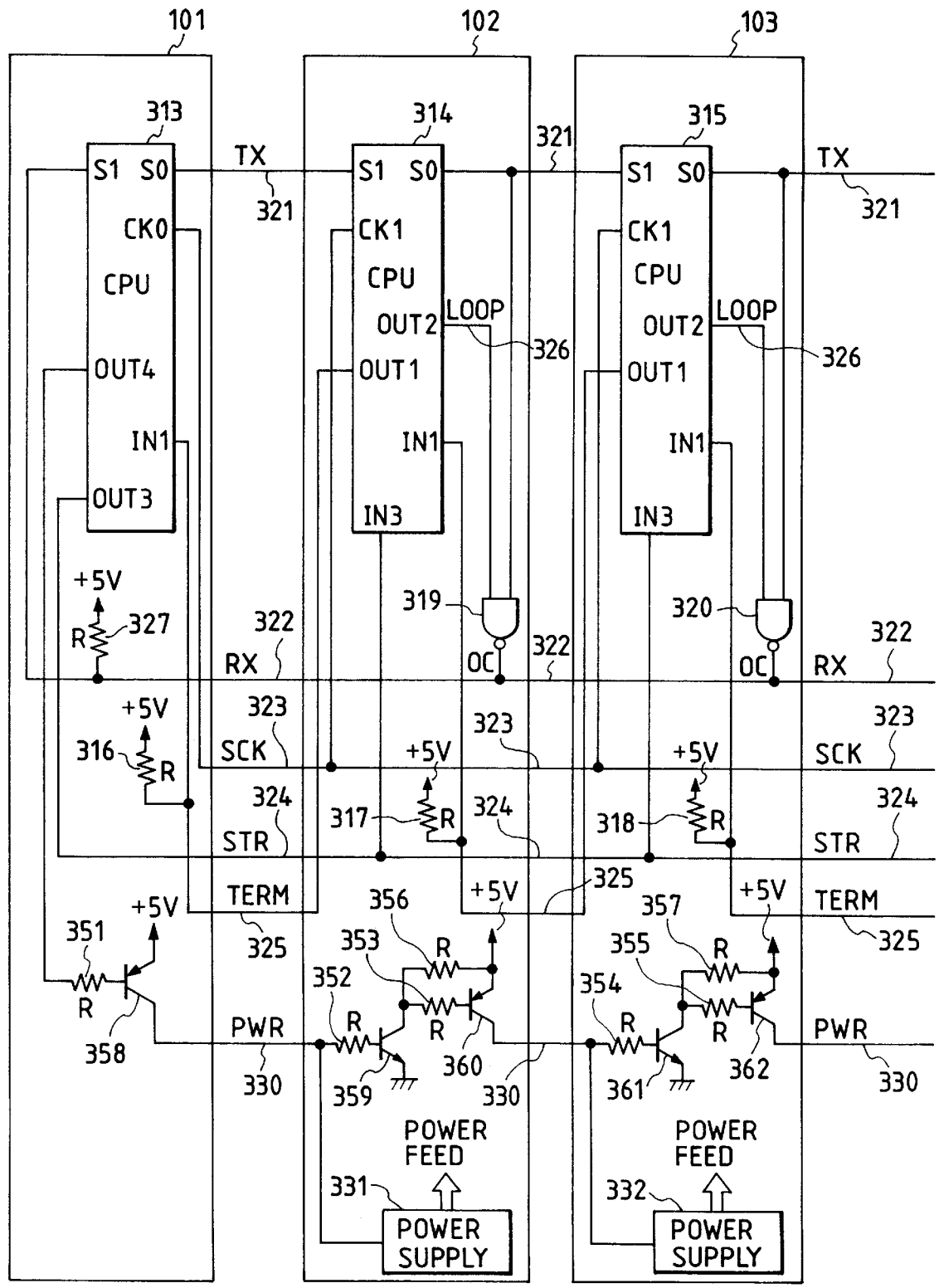
FIG. 21 is a diagram illustrating the connection for the serial communication according to a ninth embodiment of the present invention.

The ninth embodiment is based on the seventh embodiment shown in FIG. 14 except that the method for transmitting the signal PWR 330 is different (FIG. 21). The ninth embodiment has: current resistors 351 through 355; pull-up resistors 356 and 357; and transistors 358 through 362. When the CPU 313 issues the low-level signal from I/O port OUT4, the transistor 358 turns ON and the PWR 330 is set to TRUE.

In the next connected unit, the transistor 359 turns ON, the voltage becomes high at the left end of the resistor 352, and the power supply 331 is turned ON, thus starting the power feed. As soon as the power feed is begun, the transistor 360 turns ON and the PWR 330 is set to TRUE, turning ON the power of the following connected unit.

When the CPU 313 issues the high-level signal through OUT4, the transistor 358 turns OFF and the PWR 330 is set to FALSE. This turns OFF the transistor 359 and then turns OFF the transistor 360, thus setting the following PWR 330 to FALSE. When the PWR 330 is set to FALSE, the power supply 331 is turned OFF, stopping the power feed.

Thus, the signal PWR 330 for controlling the ON and OFF of the power of the Nth connected unit is driven by the power supply of the unit of the Nth minus one; therefore, the power supplies of many connected units can be turned ON/OFF at low power. When turning OFF the power of connected units, the signal is transmitted with a time delay due to the transition of the transistors, so that the power of the connected units can be turned OFF nearly at the same time.

What is claimed is:

1. A communication apparatus, comprising:
   communication means for communicating data between a first apparatus and a second apparatus, said first apparatus on an upstream side and said second apparatus on a downstream side; and
   controlling means for controlling said communication apparatus in accordance with data received by said communication means;
   said communication means including:
      first receiving means for receiving data from said first apparatus;
      first transmitting means for transmitting said data received by said first receiving means to said second apparatus;
      second receiving means for receiving data from said second apparatus;
      second transmitting means for transmitting said data received by said second receiving means to said first apparatus; and
      returning means for returning said data transmitted by said first transmitting means to said second transmitting means,
      wherein said returning means is activated when a communication with said second apparatus is not available.

2. The apparatus according to claim 1, wherein said returning means includes connecting means for connecting said first transmitting means to said second receiving means.

3. The apparatus according to claim 1, wherein said returning means includes connecting means for connecting said first transmitting means to said second receiving means.

4. The apparatus according to claim 1, further comprising storage means for storing data string between said first receiving means and said first transmitting means.

5. The apparatus according to claim 4, wherein said storage means comprises a shift register.

6. The apparatus according to claim 1, further comprising detecting means for detecting that said second apparatus is not connected to said communication apparatus, wherein said returning means is activated in response to a detection of non-connection by said detecting means.

7. The apparatus according to claim 1, wherein said first apparatus is one of an image forming apparatus which performs image formation to a sheet of a sheet handling apparatus which handles a sheet, and said second apparatus is a sheet handling apparatus which handles a sheet.

8. The apparatus according to claim 4, further comprising input means for inputting a signal from said first apparatus and output means for outputting the signal input from said input means to said second apparatus, wherein said controlling means reads the data string in said shift register in response to the input of the signal from said input means.

9. The apparatus according to claim 4, wherein said controlling means writes data to be transmitted to said first apparatus into said storage means.

10. The apparatus according to claim 5, wherein said controlling means writes data to be transmitted to said first apparatus into said storage means.

11. A communication apparatus, comprising:

communication means for communicating data between a first apparatus and a second apparatus, the first apparatus on an upstream side and the second apparatus on a downstream side; and controlling means for controlling said communication apparatus in accordance with data received by said communication means;

said communication means including:

first receiving means for receiving data from said first apparatus;

first transmitting means for transmitting the data received by said first receiving means to said second apparatus;

second receiving means for receiving data from said second apparatus;

second transmitting means for transmitting the data received by said second receiving means to said first apparatus; and returning means for returning said data transmitted by said first transmitting means to said second transmitting means, wherein said returning means is activated when a connection with said second apparatus is not made.

12. The apparatus according to claim 11, wherein said returning means includes connecting means for connecting said first transmitting means to said second receiving means.

13. The apparatus according to claim 11, further comprising storage means for storing data string between said first receiving means and said first transmitting means.

14. The apparatus according to claim 11, wherein said storage means comprises a shift register.

15. The apparatus according to claim 11, further comprising detecting means for detecting that said second apparatus is not connected to said communication apparatus, wherein said returning means is activated in response to a detection of non-connection by said detecting means.

16. The apparatus according to claim 11, wherein said first apparatus is one of an image forming apparatus which performs image formation to a sheet of a sheet handling apparatus which handles a sheet, and said second apparatus is a sheet handling apparatus which handles a sheet.

17. The apparatus according to claim 14, further comprising input means for inputting a signal from said first apparatus and output means for outputting the signal input from said input means to said second apparatus, wherein said controlling means reads the data string in said shift register in response to the input of the signal from said input means.

* * * * *

UNITED STATES PATENT AND TRADEMARK OFFICE
CERTIFICATE OF CORRECTION

PATENT NO. : 5,841,362

DATED : November 24, 1998

INVENTOR(S) : AKIHIRO NAKAMURA, ET AL.

It is certified that error appears in the above-identified patent and that said Letters Patent is hereby corrected as shown below:

<u>COVER PAGE [56]</u>,
Assistant Examiner, "Youel Beaulieu" should read --Yonel Beaulieu--; and
Foreign Patent Documents, "Denmark" should read --Germany--.

<u>FIGURE 7</u>,
"RETRANSMISSION" (all occurrences) should read
--RETRANSMISSIONS--.

<u>COLUMN 3</u>,
Line 12, "roller" should read --rollers--.

<u>COLUMN 6</u>,
Line 67, "S224:" should read --S224--.

<u>COLUMN 12</u>,
Line 4, "5285)." should read --S285).--.

Signed and Sealed this

Twenty-seventh Day of July, 1999

Attest:

Q. TODD DICKINSON

*Attesting Officer*     *Acting Commissioner of Patents and Trademarks*